(12) United States Patent
Otsuka et al.

(10) Patent No.: US 10,248,517 B2
(45) Date of Patent: Apr. 2, 2019

(54) COMPUTER-IMPLEMENTED METHOD, INFORMATION PROCESSING DEVICE, AND RECORDING MEDIUM

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 15/373,428

(22) Filed: Dec. 8, 2016

(65) Prior Publication Data

US 2017/0168911 A1 Jun. 15, 2017

(30) Foreign Application Priority Data

Dec. 14, 2015 (JP) .................. 2015-243219

(51) Int. Cl.
*G06F 11/07* (2006.01)
*G06F 11/22* (2006.01)

(52) U.S. Cl.
CPC ........ *G06F 11/2257* (2013.01); *G06F 11/079* (2013.01); *G06F 11/0748* (2013.01); *G06F 11/2289* (2013.01)

(58) Field of Classification Search
CPC ............... G06F 11/079; G06F 11/2257; G06F 11/2289; G06F 11/3051; G06N 5/048; G06N 99/005
See application file for complete search history.

(56) References Cited

U.S. PATENT DOCUMENTS

| 6,944,759 | B1 * | 9/2005 | Crisan | ............... G06F 8/64 |
| | | | | 702/123 |
| 2003/0093709 | A1 * | 5/2003 | Ogawa | ............ G06F 11/0709 |
| | | | | 714/4.3 |

(Continued)

FOREIGN PATENT DOCUMENTS

| JP | 2007-257092 | 10/2007 |
| JP | 2009-245029 | 10/2009 |
| JP | 2009-277130 | 11/2009 |

*Primary Examiner* — Gabriel Chu
(74) *Attorney, Agent, or Firm* — Fujitsu Patent Center

(57) ABSTRACT

A computer-implemented method includes: acquiring learning data from the plurality of processing devices in which a setting item, a setting value that include a setting error included in configuration information acquired when a fault in a system has occurred, and a fault type are associated with each other; determining whether each of fault types included in the learning data depends on a software configuration; extracting first software configuration information indicating a combination of setting files in which settings related to software are described, from the configuration information, based on a result of the determining; extracting second software configuration information indicating a combination of setting files in which settings related to software are described, from configuration information of a detection target; and determining whether to output an indication of a fault occurrence within the detection target by comparing the second software configuration information with the first software configuration information.

15 Claims, 28 Drawing Sheets

(56) References Cited

U.S. PATENT DOCUMENTS

| | | | |
|---|---|---|---|
| 2005/0188268 A1* | 8/2005 | Verbowski | G06F 11/0748 714/37 |
| 2006/0025962 A1* | 2/2006 | Ma | G06Q 10/10 702/182 |
| 2009/0216697 A1* | 8/2009 | Beaty | G06N 99/005 706/45 |
| 2009/0248596 A1 | 10/2009 | Matsumoto et al. | |
| 2011/0016355 A1* | 1/2011 | Watanabe | G06F 11/2257 714/37 |
| 2013/0191694 A1* | 7/2013 | Gotoh | G06F 11/079 714/48 |
| 2015/0006974 A1* | 1/2015 | Uchiumi | G06F 9/445 714/49 |

* cited by examiner

FIG. 5

| 42 |
|---|
| FAULT TYPE |
| F001 |
| F002 |

FIG. 6

| KEY |
|---|
| /etc/httpd/conf/httpd.conf:AuthMySQLUser |
| /etc/my.conf:port |
| /proc/sys/kernel/random/entropy_avail |

| FAULT TYPE | KEY | VALUE $V_A$ | VALUE $V_B$ |
|---|---|---|---|
| F003 | /etc/httpd/conf/httpd.conf:AuthMySQLUser | user_name | user001 |
| F003 | /etc/my.conf:port | 3306 | 3309 |

FIG. 8

| FAULT TYPE | KEY |
|---|---|
| F001 | /proc/sys/kernel/random/entropy_avail |
|  |  |

| FAULT TYPE | KEY | TRUE OR FALSE | VALUE | NUMBER OF TIMES |
|---|---|---|---|---|
| F003 | /etc/httpd/conf/httpd.conf: AuthMySQLUser | Failure | user_name | 2 |
| F003 | /etc/httpd/conf/httpd.conf: AuthMySQLUser | Success | user001 | 1 |
| F003 | /etc/httpd/conf/httpd.conf: AuthMySQLUser | Success | webadmin | 1 |
| F004 | /etc/httpd/conf/httpd.conf: KeepAlive | Failure | Off | 3 |
| F004 | /etc/httpd/conf/httpd.conf: KeepAlive | Success | On | 3 |

FIG. 10

| FAULT TYPE | KEY | NUMBER OF TIMES $N_S$ | NUMBER OF TIMES $N_F$ |
|---|---|---|---|
| F003 | /etc/httpd/conf/httpd.conf:AuthMySQLUser | 2 | 2 |
| F004 | /etc/httpd/conf/httpd.conf:KeepAlive | 3 | 3 |

FIG. 11

| FAULT TYPE | KEY | SPECIFIC SCORE $S_S$ | SPECIFIC SCORE $S_F$ |
|---|---|---|---|
| F003 | /etc/httpd/conf/httpd.conf: AuthMySQLUser | 0.30 | 0 |
| F004 | /etc/httpd/conf/httpd.conf: KeepAlive | 0 | 0 |

FIG. 12

| ID | IDENTIFICATION INFORMATION OF SETTING FILE |
|---|---|
| 1 | /etc/xxx.conf |
| 2 | /etc/yyy.conf |
| 3 | /etc/my.cnf |
| 4 | /etc/httpd/conf/httpd.conf |
| 5 | /etc/bbb.conf |
| 6 | /etc/aaa.conf |

FIG. 13

| FAULT TYPE | KEY | SOFTWARE CONFIGURATION PATTERN |
|---|---|---|
| F003 | /etc/httpd/conf/httpd.conf:AuthMySQLUser | 4,3,2,1 |
| F003 | /etc/httpd/conf/httpd.conf:AuthMySQLUser | 4,3,2,1 |
| F004 | /etc/httpd/conf/httpd.conf:KeepAlive | 4,3,2,1 |
| F004 | /etc/httpd/conf/httpd.conf:KeepAlive | 4,3,2,1 |
| F004 | /etc/httpd/conf/httpd.conf:KeepAlive | 4,1,6,5 |

FIG. 16

| FAULT TYPE | KEY | DEGREE OF DEPENDENCE |
|---|---|---|
| F003 | /etc/httpd/conf/httpd.conf:AuthMySQLUser | 2.08 |
| F004 | /etc/httpd/conf/httpd.conf:KeepAlive | 1.28 |

FIG. 17

| FAULT TYPE | KEY | VALUE $V_A$ | DETECTION SCORE |
|---|---|---|---|
| F003 | /etc/httpd/conf/httpd.conf:AuthMySQLUser | user_name | 1.0 |
| F004 | /etc/httpd/conf/httpd.conf:KeepAlive | Off | 1.0 |

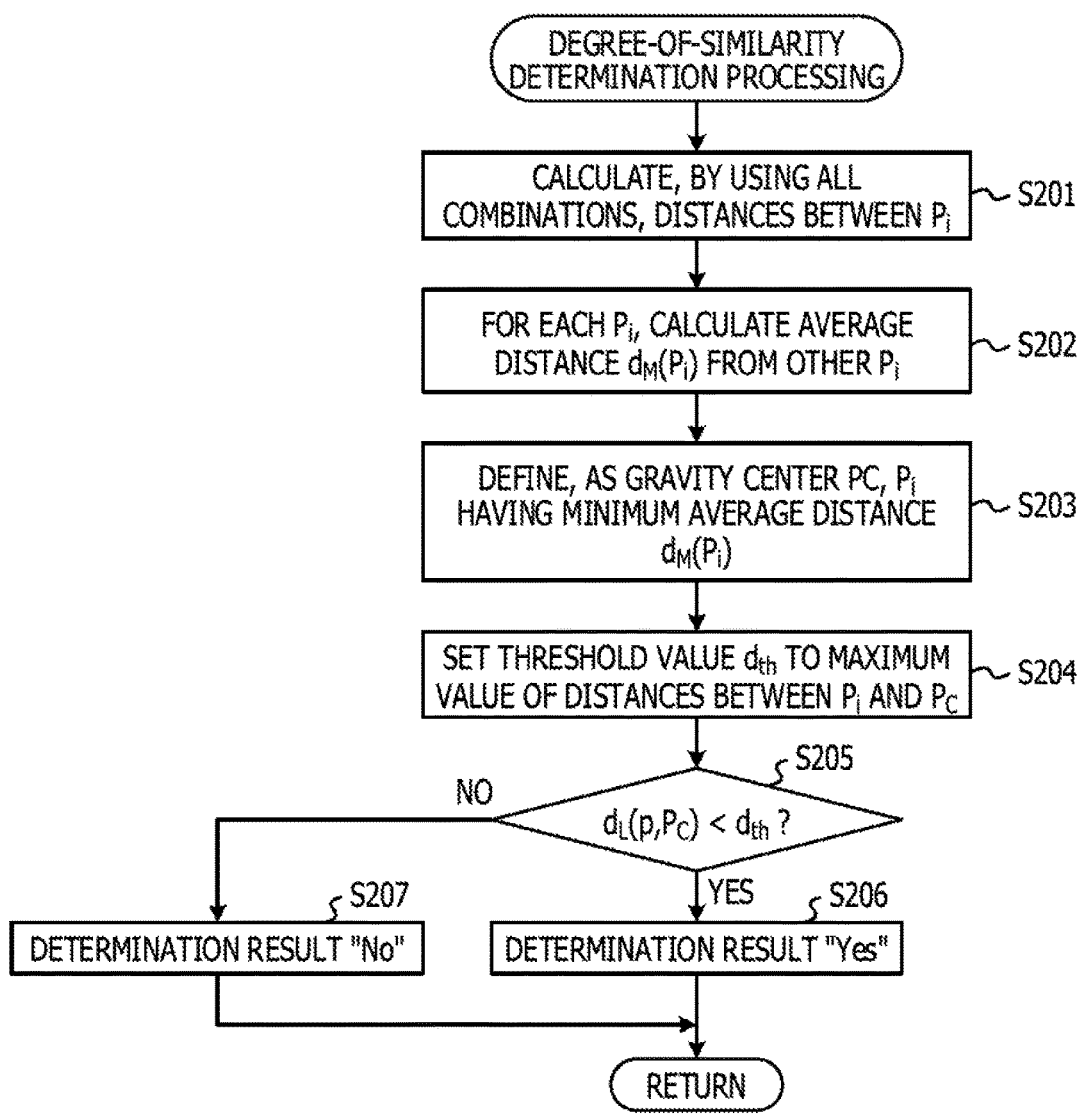

COMPUTER-IMPLEMENTED METHOD, INFORMATION PROCESSING DEVICE, AND RECORDING MEDIUM

CROSS-REFERENCE TO RELATED APPLICATION

This application is based upon and claims the benefit of priority of the prior Japanese Patent Application No. 2015-243219, filed on Dec. 14, 2015, the entire contents of which are incorporated herein by reference.

FIELD

The embodiments discussed herein are related to a computer-implemented method, an information processing device, and a recording medium.

BACKGROUND

In the past, a service of monitoring a system operated by a user side has been provided, and in a case where a sign of a fault occurrence in the system is detected, the service notifies an administrator or the like on the user side that the sign of the fault occurrence has been detected.

There is proposed a technology for causing a storage medium to hold common software to be set up in devices, configuration information of a device in which a setup operation has been already implemented, and setup result information of common software for a device in which a setup operation has been already implemented. In this technology, an analysis device determines common software to be set up in the device itself, reads, from the storage medium, configuration information corresponding to the relevant common software, and compares it with configuration information of the device itself, held in a self-device information table. In addition, from among devices in which setup operations have been already implemented, the analysis device determines a device having the same configuration or a device having a similar configuration. In addition, the analysis device reads, from the storage medium, setup result information related to the device having the same configuration or the device having a similar configuration and outputs it as setup success-or-failure information of the common software.

There is proposed a configuration information management database (CMDB) in which a piece of know-how is able to be shared by configuration items (CIs). In this CMDB, CIs and pieces of know-how are separately registered. In addition, within the CMDB, each set of "attribute: value" registered in a corresponding CI is associated with a piece of know-how related thereto. A set of "attribute: value" common to a number of associated CIs is registered in the corresponding piece of know-how.

There is a proposed a method for assisting handling with a fault in an operating device including configuration items such as program modules. In this method, inputting of a fault status related to a fault in one operating device, and similar fault status information is extracted from a database regarding configuration items related to another operating device while using the received fault status information as a search key. In addition, a cause of a fault related to the extracted fault status information and a handling method therefor are output as a cause of the fault related to the received fault status information and a handling method therefor. As related art, for example, Japanese Laid-open Patent Publication No. 2009-277130, Japanese Laid-open Patent Publication No. 2009-245029, Japanese Laid-open Patent Publication No. 2007-257092, and so forth are disclosed.

Various settings related to a current system are changed in accordance with a status during a system operation in some cases. While changing of settings is performed by an administrator or the like, it may be thought that a setting error is caused depending on a level of knowledge of the administrator regarding the system. The setting error appears as various statuses caused by an operation of the system after the administrator changes the settings. Storing results, which appear as various statuses, as learning data while associating the results with setting items and setting values in which setting errors occur may be considered, and in a case where a setting related to the system is performed, detecting, based on the learning data, a setting error may be considered.

However, changing of a setting causes a system operation after that to be changed, in some cases. In a case where a setting of, for example, software currently used in the system is changed, there is a possibility that a normal range of a setting value of a setting item indicated by the learning data is changed. In a case of using learning data acquired by another system, there is a difference in pieces of software used in individual systems between the other system and the system itself, in some cases. In such a case, it is difficult to adequately detect a setting error in the system itself, by using the learning data acquired by the other system, in some cases. Therefore, it is desirable that even in a case where a software configuration is changed, it is possible to adequately detect a setting error.

SUMMARY

According to an aspect of the invention, a computer-implemented method for detecting a fault occurrence within a computer system including an information processing device, the method includes acquiring learning data from the plurality of processing devices in which a setting item, a setting value that include a setting error included in configuration information acquired when a fault in a system has occurred, and a fault type are associated with each other; storing the learning data in a database; determining whether each of fault types included in the learning data depends on a software configuration; extracting first software configuration information indicating a combination of setting files in which settings related to software are described, from the configuration information, based on a result of the determining; extracting second software configuration information indicating a combination of setting files in which settings related to software are described, from configuration information of a processing device, which is the detection target; and determining whether to output an indication of the fault occurrence within the detection target based on a result obtained by comparing the second software configuration information with the first software configuration information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a fault type list;

FIG. 6 is a diagram illustrating an example of a key list;

FIG. 7 is a diagram illustrating an example of a pattern list;

FIG. 8 is a diagram illustrating an example of a disregard list;

FIG. 9 is a diagram illustrating an example of a learning data database (DB);

FIG. 10 is a diagram illustrating an example of a count data DB;

FIG. 11 is a diagram illustrating an example of a specific score DB;

FIG. 12 is a diagram illustrating an example of a setting file list;

FIG. 13 is a diagram illustrating an example of a software configuration DB;

FIG. 16 is a diagram illustrating an example of a degree-of-dependence DB;

FIG. 17 is a diagram illustrating an example of a sign detection result list;

FIG. 28 is a flowchart illustrating another example of the degree-of-similarity determination processing.

DESCRIPTION OF EMBODIMENTS

Hereinafter, examples of embodiments according to the present technology will be described in detail with reference to drawings.

Figure 1:
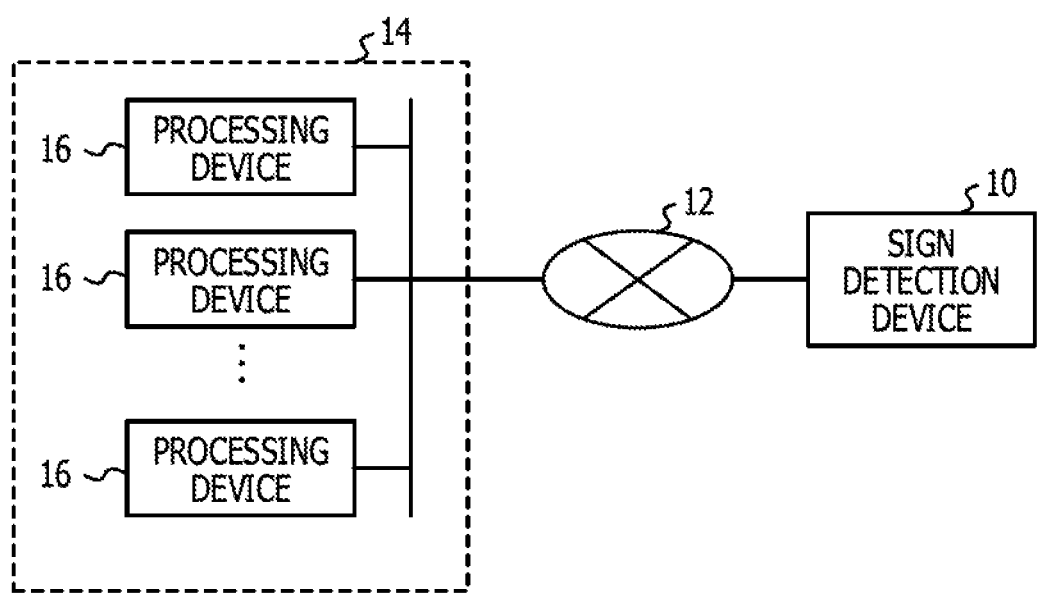
FIG. 1 is a schematic view illustrating a system configuration including a sign detection device according to the present embodiment.

As illustrated in FIG. 1, a sign detection device 10 according to the present embodiment is coupled to a processing system 14 including processing devices 16, via a network 12 such as the Internet. The sign detection device 10 monitors each of the processing devices 16 and detects a sign of a fault occurrence in the processing devices 16.

Sign detection of a fault occurrence in the processing devices 16 may be performed by determining whether or not a correct value is set as a setting value of each of various setting items in, for example, configuration information (the details thereof will be described later) of the processing devices 16. For a method for determining whether or not a set value is correct, a method for comparing the set value with learning data of a correct answer or learning data of an erroneous answer, which is provided in advance, may be assumed. In a case of comparing the set value and a value of the learning data of a correct answer, it is possible to determine that the set value is correct if the two values coincide with each other. In a case of comparing the set value and a value of the learning data of an erroneous answer, it is possible to determine that the set value is incorrect if the two values coincide with each other.

However, there are two causes of a fault occurrence in the processing devices 16. One of the causes is a case of setting an erroneous value as a value of one of the setting items of the configuration information, and the other of the causes is a case of an occurrence of omission of changing a value to be changed. In this manner, there are differences in the causes of a fault occurrence. Therefore, it is difficult to determine which one of the learning data of a correct answer and the learning data of an erroneous answer is to be compared with the set value in order to make it possible to perform more adequate sign detection.

A case where a value of a setting item in which a predetermined initial value is set has to be changed to an adequate value for each of the processing devices 16 is assumed, for example. In this case, in a case where there is omission of changing the value, the value of the setting item remains the initial value, and thus this becomes a cause of a fault occurrence. In this case, there is a possibility that a correct setting value is different for each of the processing devices 16. Therefore, it is not easy to prepare learning data of a correct answer to cover all of these values. In this case, learning data to indicate an error in a case where the initial value is set is prepared in advance, and it is possible to more adequately detect a sign of a fault occurrence by comparing the learning data of an erroneous answer and the set value.

Therefore, in the sign detection device 10 according to the present embodiment, both learning data of a correct answer and learning data of an erroneous answer, which are to be compared with the set value, are prepared in advance, and learning data that enables more adequate detection of a sign of a fault occurrence is identified and used.

In a case of detecting a sign of a fault occurrence by comparing values before and after changing of the configuration information, it is difficult to detect a case where omission of changing of setting values causes a fault occurrence. The reason is that there is no change in value even if the values before and after changing of the configuration information are compared. In the present embodiment, learning data of a correct answer and learning data of an erroneous answer are generated from the configuration information before and after a fault recovery, and the pieces of learning data and a set value are compared, thereby determining whether or not the set value is correct.

Figure 2:
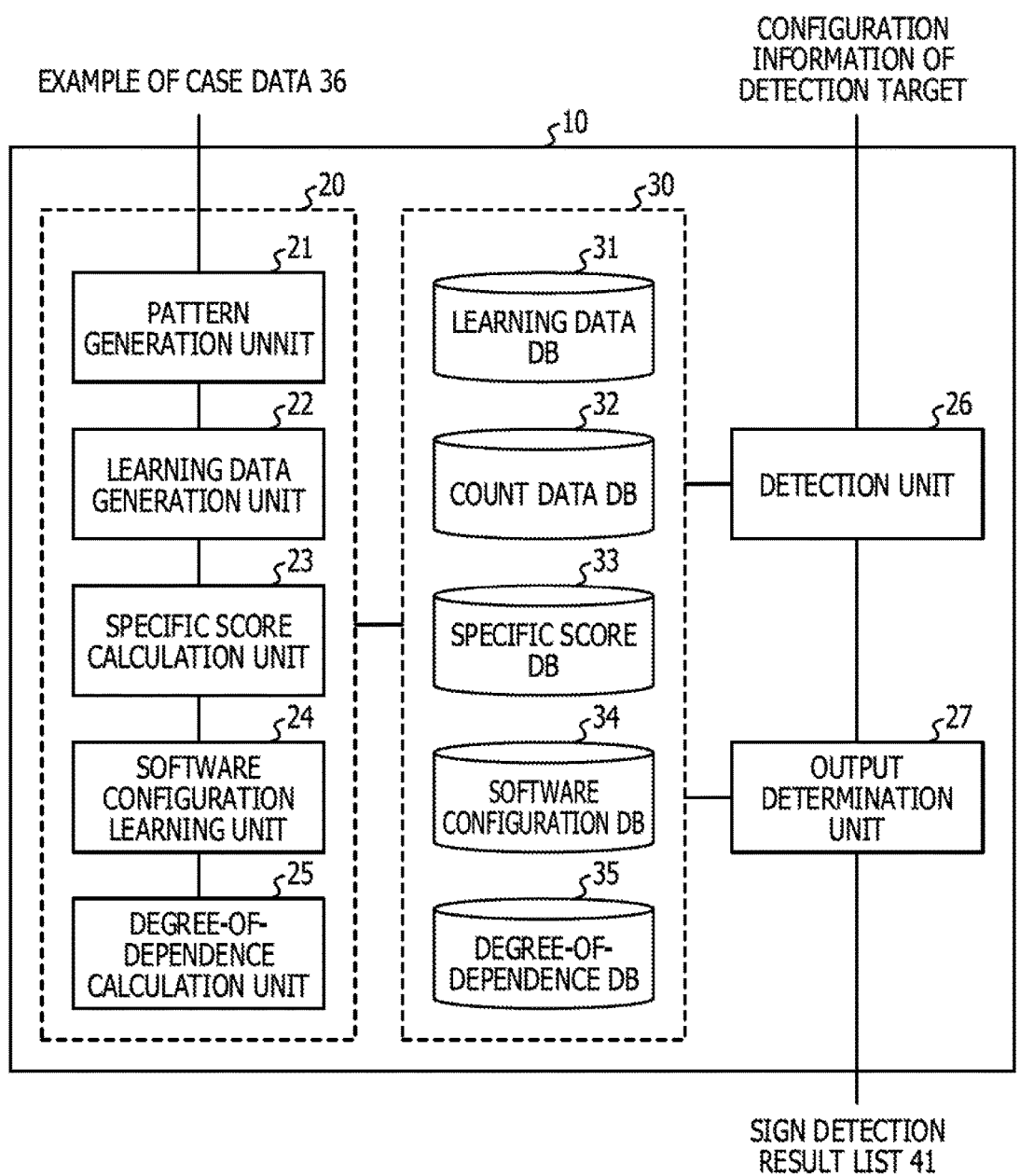
FIG. 2 is a functional block diagram of the sign detection device according to the present embodiment.

FIG. 2 illustrates a functional block diagram of the sign detection device 10. As illustrated in FIG. 2, the sign detection device 10 includes a learning unit 20, a detection unit 26, and an output determination unit 27. Furthermore, the learning unit 20 includes a pattern generation unit 21, a learning data generation unit 22, a specific score calculation unit 23, a software configuration learning unit 24, and a degree-of-dependence calculation unit 25. In a storage unit 30, a learning data database (DB) 31, a count data DB 32, a specific score DB 33, a software configuration DB 34, and a degree-of-dependence DB 35 are stored. The individual databases will be described later.

Figure 3:
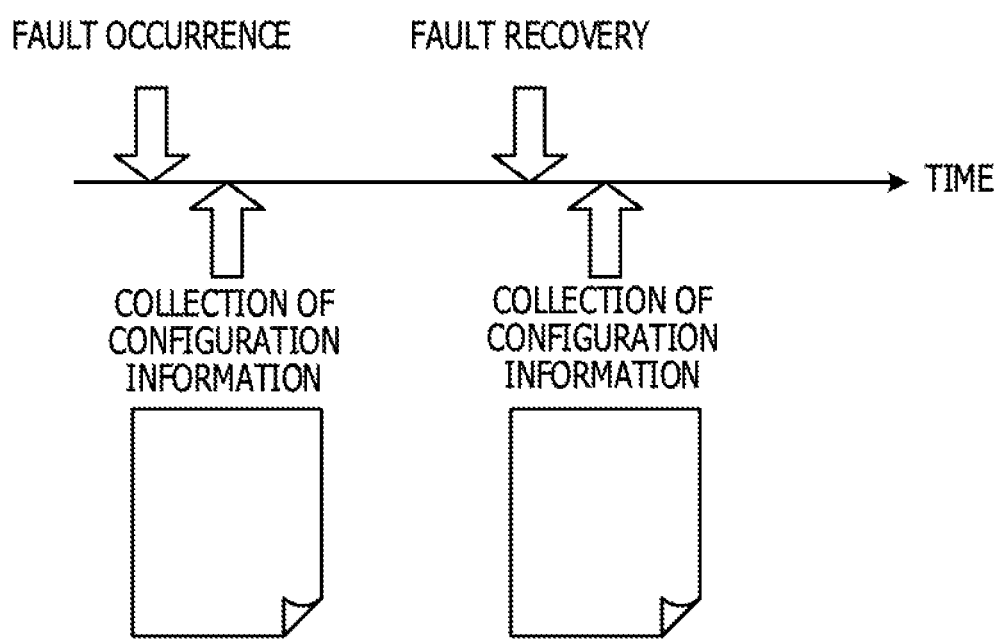
FIG. 3 is a diagram for explaining a relationship between an occurrence of a fault, a recovery therefrom, and collection of configuration information.

Here, as illustrated in FIG. 3, in a case where a fault occurs in one of the processing devices 16, configuration information is collected immediately after the fault occurrence in order to confirm a state at a time of the fault occurrence. In addition, after a recovery from the fault, the configuration information is collected in order to record a recovery work and to perform an operation check. A set of the pieces of configuration information that are collected before and after the fault recovery is input to the sign detection device 10 as case data. The configuration information includes a configuration of hardware to configure the corresponding processing device 16 and a setting file group in which settings related to pieces of software, such as an operating system (OS) and applications, which are installed in the corresponding processing device 16 are described. The configuration information is, for example, data of a directory structure, which is obtained by extracting information related to a configuration from the file system of the corresponding processing device 16 by using a known dedicated tool of a related art.

Figure 4:
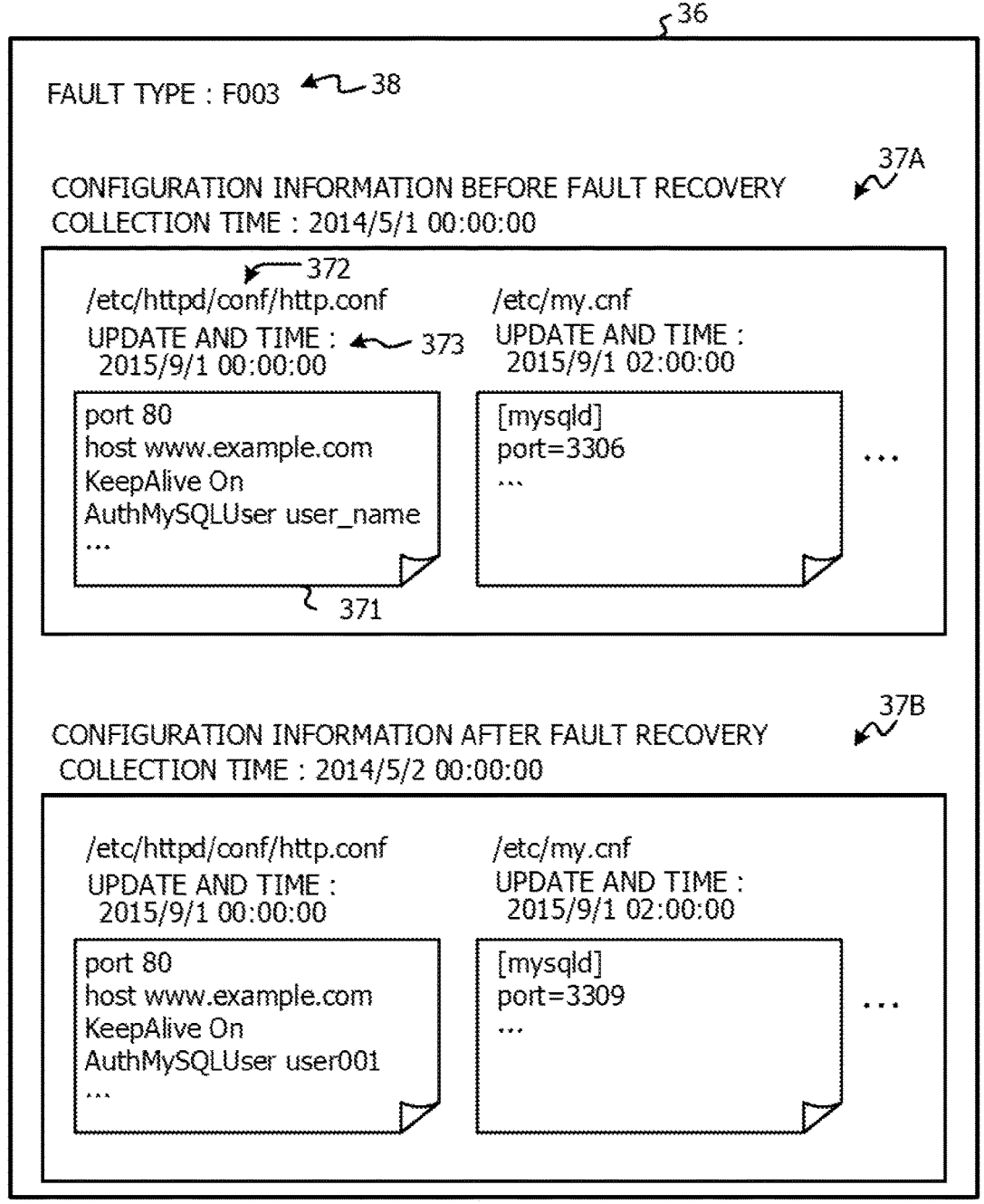
FIG. 4 is a diagram illustrating an example of case data.

FIG. 4 illustrates an example of case data 36. In the example of FIG. 4, configuration information 37A collected before a fault recovery is recorded along with its collection time. Configuration information 37B collected after the fault recovery is recorded along with its collection time. In each of the pieces of configuration information 37A and 37B, regarding each of setting files 371, identification information 372 and an update date and time 373 of the corresponding setting file 371 are recorded. Here, as the identification information 372 of each of the setting files 371, a path from a root directory to the corresponding setting file 371 is used. In each of the setting files 371, a setting item and a setting value for the setting item are described. In the first setting file 371 of the configuration information 37A before the fault recovery, illustrated in FIG. 4, a setting value "user_name" is set for a setting item "AuthMySQLUser".

Furthermore, in the case data 36, a fault type 38 serving as identification information preliminarily defined for each of types of fault. A worker or the like who collects the configuration information at a time of, for example, a fault recovery records the fault type 38 in the case data 36.

The pattern generation unit 21 receives the pieces of case data 36 as inputs and accumulates these in a predetermined storage area. The pattern generation unit 21 records, in such a fault type list 42 as illustrated in, for example, FIG. 5, the fault type 38 included in each of the accumulated pieces of case data 36. No redundant fault type is recorded.

The pattern generation unit 21 extracts all keys for identifying various setting items related to a configuration, from each of the configuration information 37A before the fault recovery and the configuration information 37B after the fault recovery, which is included in each of the pieces of case data 36. As a key, a combination of, for example, identification information of a setting file in which a setting value of a setting item is set and a setting item name set in the relevant setting file may be used. The pattern generation unit 21 extracts, as a key, "/etc/httpd/conf/httpd.conf:AuthMySQLUser" from, for example, the first setting file of the configuration information 37A before the fault recovery in the case data 36 in FIG. 4. The pattern generation unit 21 lists the extracted keys and creates such a key list 43 as illustrated in, for example, FIG. 6.

For each of keys recorded in the key list 43, in a case where values before and after the fault recovery are different, the pattern generation unit 21 generates a pattern in which a fault type, a key, and the values before and after the fault recovery are associated with one another. In the case data 36 in, for example, FIG. 4, for the key "/etc/httpd/conf/httpd.conf:AuthMySQLUser", a value "user_name" before the fault recovery and a value "user001" after the fault recovery are different. Therefore, a pattern, in which a fault type "F003", the key "/etc/httpd/conf/httpd.conf:AuthMySQLUser", the value "user_name" before the fault recovery, and the value "user001" after the fault recovery are associated with one another, is generated. The pattern generation unit 21 records a pattern generated for each of the keys, in such a pattern list 44 as illustrated in, for example, FIG. 7. In the example in FIG. 7, "VALUE $V_A$" is the value before the fault recovery, and "VALUE $V_B$" is the value after the fault recovery.

Furthermore, the pattern generation unit 21 deletes, from the pattern list 44, a pattern having a fault type and a key that coincide with a set of a fault type and a key predetermined in such a disregard list 45 as illustrated in, for example, FIG. 8. In the disregard list 45, a key by which it is difficult to find a cause and a sign of a fault occurrence by comparing values before and after a fault recovery, such as, for example, a key whose value changes every time a system is started, is predetermined for each of fault types.

The learning data generation unit 22 generates learning data from each of patterns recorded in the pattern list 44 generated by the pattern generation unit 21. The learning data is data obtained, for each of fault types, by aggregating, for a certain key, the number of occurrences of a certain value as a correct answer, and the number of occurrences of a certain value as an error. Patterns recorded in the pattern list 44 each include values before and after a fault recovery for the corresponding one of keys. The value $V_A$ before the fault recovery is an erroneous value. The value $V_B$ after the fault recovery is a correct value.

As illustrated in, for example, FIG. 9, pieces of learning data each including items of a fault type, a key, "true" or "false", a value, and the number of times are recorded in the learning data DB 31. For 1 pattern, the learning data generation unit 22 increases, by "1", the number of times of learning data having a fault type, a key, and a value that coincide with a fault type, a key, and a value $V_A$ before a fault recovery, respectively, of a certain pattern and having "true" or "false" of "Failure". For 1 pattern, the learning data generation unit 22 increases, by "1", the number of times of learning data having a fault type, a key, and a value that coincide with a fault type, a key, and a value $V_B$ before a fault recovery, respectively, of a certain pattern and having "true" or "false" of "Success". In a case where no learning data having a fault type, a key, and a value $V_A$ before a fault recovery or a value $V_B$ after the fault recovery that coincide with a pattern is registered in the learning data DB 31, the learning data generation unit 22 sets the number of times to "1" after adding the corresponding piece of learning data.

As illustrated in, for example, FIG. 10, the learning data generation unit 22 records, in the count data DB 32, the number of times $N_S$, which is obtained by counting, for each of fault types and for each of keys, the number of pieces of learning data each having "true" or "false" of "Success". In the same way, the learning data generation unit 22 records, in the count data DB 32, the number of times $N_F$, which is obtained by counting, for each of fault types and for each of keys, the number of pieces of learning data each having "true" or "false" of "Failure".

The specific score calculation unit 23 calculates a specific score for identifying whether to use learning data having a correct value or learning data having an erroneous value among the learning data at a time of detecting a sign of a fault occurrence from the configuration information of a detection target. The specific score represents that with an increase in the probability of having a same value as a value for a certain key, in other words, with a decrease in the number of variations of a value for the certain key, a possibility that the value is correct or erroneous increases.

The specific score calculation unit 23 obtains an empirical probability of the occurrence of each of values of the learning data having "true" or "false" of "Success" for a certain key for a certain fault type in the learning data DB 31, for example. In addition, the specific score calculation unit 23 calculates a conditional entropy from the obtained probability. In addition, the specific score calculation unit 23 determines the conditional entropy as a specific score $S_S$ of a correct answer indicating the possibility of the learning data having "true" or "false" of "Success". In the same way, the specific score calculation unit 23 calculates a conditional entropy from an empirical probability of the occurrence of each of values of the learning data having "true" or "false" of "Failure". In addition, the specific score calculation unit 23 determines the conditional entropy as a specific score $S_F$ of a correct answer indicating the possibility of the learning data having "true" or "false" of "Failure". The specific score $S_S$ is expressed by the following Expression (1). The specific score $S_F$ is expressed by the following Expression (2). "$X_{Success}$" is a set of the learning data having "true" or "false" of "Success" for a certain key for a certain fault type, and "$X_{Failure}$" is a set of the learning data having "true" or "false" of "Failure".

$$S_S \stackrel{def}{=} \sum_{x \in X_{Success}} -p(x|\text{Success})\log p(x|\text{Success}) \quad (1)$$

$$S_F \stackrel{def}{=} \sum_{x \in X_{Failure}} -p(x|\text{Failure})\log p(x|\text{Failure}) \quad (2)$$

More specifically, an example of calculating the specific score $S_S$ and the specific score $S_F$ by using the learning data DB 31 illustrated in FIG. 9 and the count data DB 32 illustrated in FIG. 10 will be described. The "$X_{Success}$" and the "$X_{Failure}$" for, for example, a fault type "F003" and a key "/etc/httpd/conf/httpd.conf:AuthMySQLUser" are as follows.

"$X_{Success}$"={user001,webadmin}
"$X_{Failure}$"={user_name}

The individual pieces of learning data included in the above-mentioned sets represent values included in the pieces of learning data.

The specific score calculation unit 23 acquires, from the learning data DB 31, the number of occurrences (1 time) of the learning data of the value "user001" included in the "$X_{success}$" and the number of occurrences (1 time) of the learning data of the value "webadmin" included therein. In the same way, the specific score calculation unit 23 acquires, from the learning data DB 31, the number of occurrences (2 times) of the learning data of the value "user_name" included in the "$X_{Failure}$". The specific score calculation unit 23 acquires, from the count data DB 32, the number of occurrences $N_S$ (2 times) of the learning data having the fault type "F003", the key "/etc/httpd/conf/httpd.conf:AuthMySQLUser", and "true" or "false" of "Success". In the same way, the specific score calculation unit 23 acquires the number of occurrences $N_F$ (2 times) of the learning data having "true" or "false" of "Failure".

The specific score calculation unit 23 calculates an empirical probability for each of values of the learning data by using the obtained numbers of times, as illustrated below.

p(user001|Success)=1/2
p(webadmin|Success)=1/2
p(user_name|Failure)=2/2

The specific score calculation unit 23 calculates the specific score $S_S$ and the specific score $S_F$ as follows by using the calculated empirical probabilities and by using the above-mentioned Expressions (1) and (2).

$$S_S=-2\times 1/2 \log 1/2=0.30, \ S_F=-2/2 \log 2/2=0$$

The specific score calculation unit 23 calculates the specific score $S_S$ and the specific score $S_F$ for each of fault types and for each of keys and records the scores in such a specific score DB 33 as illustrated in, for example, FIG. 11.

Here, in order to improve the accuracy of sign detection, it is desirable that a large number of the pieces of case data 36 are collected and a large number of pieces of learning data are accumulated. Therefore, in order to collect a large number of the pieces of case data 36, generating the learning data by using the case data 36 collected by another system is considered. In this case, depending on a difference between a system that collects the case data 36 and a system serving as a target of sign detection of a fault, setting values to be correct or erroneous differ in some cases even in a case of the same setting item.

It is assumed that the case data 36 in which a fault occurs in, for example, an Apache HTTP server because a setting of a setting item "/etc/httpd/conf/httpd.conf:KeepAlive" is erroneous is collected from a system. Learning data related to the key "/etc/httpd/conf/httpd.conf:KeepAlive" is obtained from this case data 36. This learning data effectively works in a case where another system is defined as a target of sign detection. In other words, in a case where a value different from learning data of a correct answer or a value equal to learning data of an erroneous answer is set in a corresponding setting item of configuration information of the system serving as a detection target, it is possible to detect a sign of a fault.

On the other hand, it is assumed that the case data 36 in which a fault occurs in an Apache HTTP server because a setting of the setting item "/etc/httpd/conf/httpd.conf:AuthMySQLUser" is erroneous is collected from a system. Learning data related to the key "/etc/httpd/conf/httpd.conf:AuthMySQLUser" is obtained from this case data 36. In addition, in a case where this learning data is used while defining another system as a target of sign detection, a sign of a fault turns out to be detected depending on a setting value for a corresponding setting item in the other system. However, in a case where a function corresponding to the setting item "/etc/httpd/conf/httpd.conf:AuthMySQLUser" is not used in the other system, detection of the sign thereof becomes inappropriate.

A setting file for software used in a system, which is related to, for example, whether or not to use a function, is edited after the software is installed in the system. In particular, main software has a higher possibility that a setting item is modified or additionally written. In a case where there is a difference in a description in such a setting file, in other words, there is a difference between software configurations, if learning data collected by another system is used, it is difficult to correctly determine whether a setting value set in a setting item is true or false, in some cases.

Therefore, in the present embodiment, it is determined whether or not a setting error depends on a software configuration. In addition, on that basis, adequately performing sign detection by using learning data of another system having a similar software configuration is enabled.

In order to do that, the software configuration learning unit 24 learns a setting value of a setting item in which a setting error occurred, and learns a software configuration of a system at a time of the occurrence of the setting error. Specifically, the software configuration learning unit 24 extracts, from the configuration information 37A from which learning data is extracted, the identification information 372 of the setting file 371 of software and the update date and time 373 of that setting file.

More specifically, the software configuration learning unit 24 searches, within the configuration information 37A, for a set of a setting item and a setting value that are matched with a regular expression. The regular expression may be defined as a set of a setting item and a setting value that are concatenated by using, for example, ": (colon)" or "=(equal)" or may be defined as a predetermined setting item name or the like. In a case where a set of a setting item and a setting value that are matched with the regular expression exists within the setting file 371, the software configuration learning unit 24 determines as being the setting file 371 of software and extracts the identification information 372 and the update date and time 373 of that setting file 371.

The software configuration learning unit 24 records the extracted identification information 372 of the setting file in a setting file list 46 serving as part of the software configuration DB 34, illustrated in, for example, FIG. 12. In addition, the software configuration learning unit 24 assigns an ID such as a numeric character or a symbol to the identification information 372. For the identification information 372 of a setting file that already exists in the setting file list 46, no new additional writing is performed. The software configuration learning unit 24 replaces the extracted identification information 372 of the setting file with the ID assigned in the setting file list 46 and sorts it in the order of an update date and time, thereby generating a software configuration pattern.

It is assumed that the pieces of identification information 372 and the update dates and times 373 of the respective setting files 371 are extracted as follows and that IDs are assigned to the respective pieces of identification information 372 as illustrated in FIG. 12.

2010/1/1, /etc/xxx.conf
2015/4/1, /etc/yyy.conf
2015/5/1, /etc/my.cnf
2015/6/1, /etc/httpd/conf/httpd.conf In this case, the software configuration learning unit 24 generates a software configuration pattern such as (4,3,2,1). Sorting in the order of the update date and time may be performed in ascending order or in descending order. In the present embodiment, an example of sorting in descending order will be described. At a time of generating a software configuration pattern, the pieces of identification information 372 of a setting file the update date and time 373 of which is earlier than a time of installing an operating system (OS) of a system and of a setting file generated for collection of learning data may be removed.

The software configuration learning unit 24 records, in such a software configuration DB 34 as illustrated in, for example, FIG. 13, the generated software configuration pattern while associating the generated software configuration pattern with the fault type 38 and a key, extracted from the corresponding piece of case data 36. In a case where fault types and keys are extracted from the same piece of case data 36, the software configuration learning unit 24 associates the generated software configuration pattern with all combinations of the fault types and the keys.

For each of the combinations of the fault types and the keys, the degree-of-dependence calculation unit 25 calculates the degree of dependence indicating whether or not a fault caused by a setting error indicated by the corresponding one of combinations of the fault types and the keys occurs depending a software configuration. In a case where a fault continuously occurs in the same software configuration, it may be thought that the fault is a fault unique to the software configuration. On the other hand, in a case where a fault occurs in various software configurations, it may be thought that the fault is a fault to occur without dependence on the software configurations. In other words, compared with a case of being independent, a fault caused by a setting error dependent on a software configuration has fewer variations of software configurations at a time of a fault occurrence. Therefore, based on variations of software configurations at a time of a fault occurrence, the degree of dependence is calculated.

The degree-of-dependence calculation unit 25 may calculate the degree of dependence, based on, for example, the following Expression (3).

$$\text{Degree of Dependence} = \text{Log} \frac{(i) \times (ii)}{(iii) + 1} \quad (3)$$

(i) is the number of cases of the case data 36 from which the corresponding fault type and key are extracted, in other words, the number of cases of entries that are included in entries (individual rows) recorded in the software configuration DB 34 and that each include the corresponding fault type and key. (ii) is the number of IDs included in software configuration patterns of the individual entries of (i). (iii) is the number of IDs that are included in the software configuration patterns of the individual entries of (i) and that are occasionally not included in other software configuration patterns.

Figure 14:
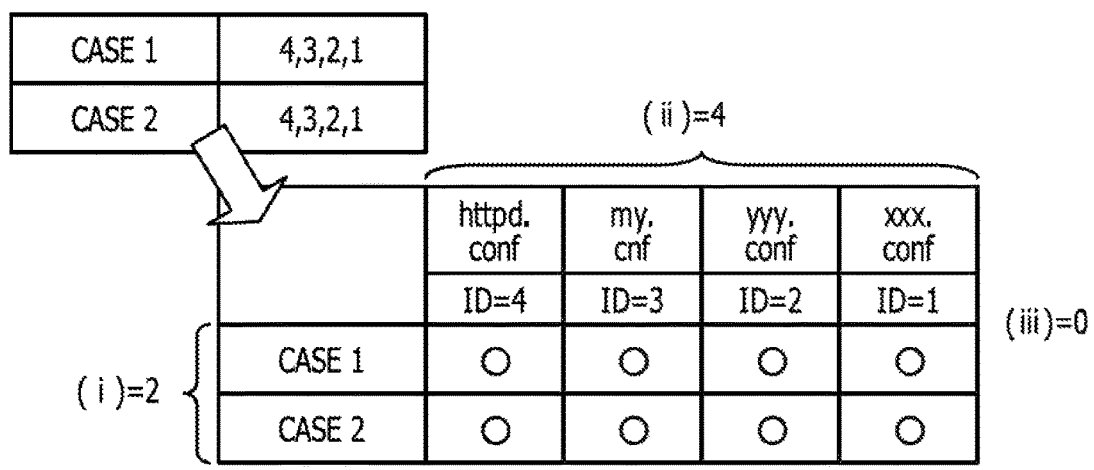
FIG. 14 is a diagram for explaining calculation of the degree of dependence.

It is assumed that, as illustrated in, for example, FIG. 14, 2 entries (a case 1 and a case 2) corresponding to a fault type and a key exist in the software configuration DB 34. The case 1 and the case 2 each have a software configuration pattern of (4,3,2,1). In this case, (i) is "2", (ii) is "4", and (iii) is "0", and then, the degree of dependence is calculated as follows.

$$\text{Degree of Dependence} = \text{Log} \frac{(i) \times (ii)}{(iii) + 1} = \text{Log} \frac{2 \times 4}{0 + 1} = 2.08$$

Figure 15:
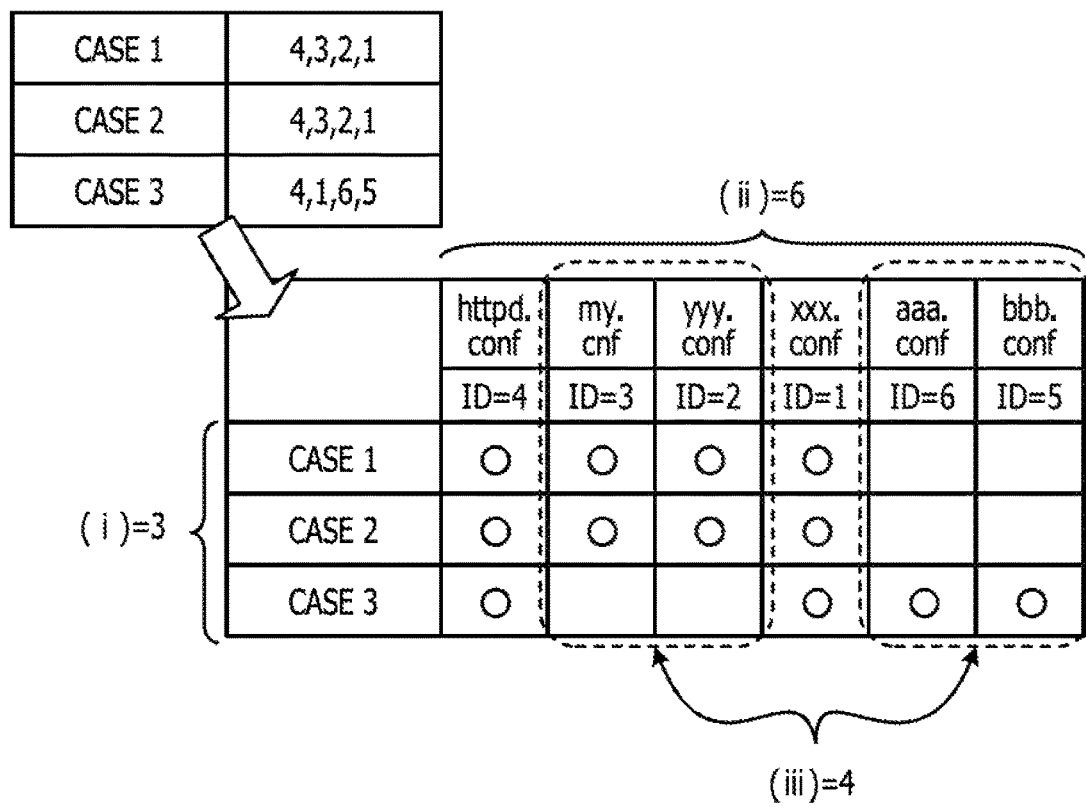
FIG. 15 is a diagram for explaining calculation of the degree of dependence.

It is assumed that, as illustrated in, for example, FIG. 15, 3 entries (the case 1, the case 2, and a case 3) corresponding to a fault type and a key exist in the software configuration DB 34. The case 1 and the case 2 each have the software configuration pattern of (4,3,2,1). The case 3 has a software configuration pattern of (4,1,6,5). In this case, (i) is "3", (ii) is "6", and (iii) is "4", and then, the degree of dependence is calculated as follows.

$$\text{Degree of Dependence} = \text{Log} \frac{(i) \times (ii)}{(iii) + 1} = \text{Log} \frac{3 \times 6}{4 + 1} = 1.28$$

In this way, according to the above-mentioned Expression (3), for a fault type and a key, it is possible to calculate the degree of dependence that increases with a decrease in variations of software configuration patterns. The degree of dependence is not limited to the example of Expression (3) and only has to increase with a decrease in variations of software configuration patterns. At a time of counting the above-mentioned (ii) and (iii), the sorting order of IDs in a software configuration pattern may be considered or does not have to be considered. It is assumed that a case 4 having a software configuration pattern of (1,6,5,4) is further included in the example of FIG. 15, for example. In this case, if the sorting order of IDs in a software configuration pattern is not considered, check marks are input to the same columns as those of the case 3 ("O" in the example of FIG. 15). In a case of considering the order of IDs in a software configuration pattern, the column of "httpd.comf ID=4" is added to the right of "bbb.conf ID=5", and a check mark is input to the seventh column of "ID=4" without being input to the first column of "ID=4".

The degree-of-dependence calculation unit 25 records, in such a degree-of-dependence DB 35 illustrated in, for example, FIG. 16, the degree of dependence calculated for each of combinations of fault types and keys.

In a case where the configuration information of a detection target is input, the detection unit 26 detects a sign of a fault occurrence by using the learning data DB 31, the count data DB 32, and the specific score DB 33, stored in the storage unit 30. Specifically, the detection unit 26 compares, with learning data, each of pieces of detection target data expressed by sets of keys and values included in the configuration information of a detection target. In addition, the detection unit 26 determines whether or not a value of each of setting items in the configuration information is correctly set. In a case of determining that a correct value is not set, the detection unit 26 detects as a sign of a fault occurrence and records it in a sign detection result list.

As described above, in the present embodiment, after identifying which one of learning data of a correct answer and learning data of an erroneous answer is to be used, sign detection is performed. Specifically, for each of fault types, the detection unit 26 acquires, from the specific score DB 33, the specific score $S_S$ and the specific score $S_F$ that correspond to a key coincident with a key included in detection target data. The specific score $S_S$ illustrated in the above-mentioned Expression (1) indicates that, with a decrease in the value thereof, the degree of probability of a possibility that a value of the learning data of a correct answer is correct increases. The specific score $S_F$ illustrated in the above-mentioned Expression (2) indicates that, with a decrease in the value thereof, the degree of probability of a possibility that a value of the learning data of an erroneous answer is erroneous increases. Therefore, for a fault type for which the specific score $S_S$ is lower than the specific score $S_F$, the detection unit 26 identifies the learning data of a correct answer as learning data to be used for detection. On the other hand, for a fault type for which the specific score $S_F$ is lower than the specific score $S_S$, the detection unit 26 identifies the learning data of an erroneous answer as learning data to be used for detection.

For a fault type for which the learning data of a correct answer is identified, the detection unit 26 compares detection target data and the learning data of a correct answer. In addition, in a case of no coincidence, the detection unit 26 detects a sign of a fault occurrence. For a fault type for which the learning data of an erroneous answer is identified, the detection unit 26 compares the detection target data and the learning data of an erroneous answer. In addition, in a case of coincidence, the detection unit 26 detects a sign of a fault occurrence. In a case of detecting a sign of a fault occurrence, the detection unit 26 records, in such a sign detection result list 41 as illustrated in, for example, FIG. 17, a sign detection result in which a detection score (details thereof will be described later) is assigned to a fault type and detection target data (a key and a value) thereof.

The detection score is a score indicating the possibility of the sign detection result. It is assumed that, for, for example, a fault type, pieces of learning data of an erroneous answer each having a key coincident with a key of detection target data exist and a value of the detection target data coincides with a value of one of the pieces of learning data of an erroneous answer. In this case, with an increase in the number of occurrences of the piece of learning data of an erroneous answer coincident with the value of the detection target data, the degree of probability of a possibility that the value is erroneous increases. Therefore, the detection unit 26 may define, as the detection score, a value obtained by dividing the number of occurrences N of the pieces of learning data of an erroneous answer coincident with the value of the detection target data by, for example, the number of occurrences $N_F$ of learning data of an erroneous answer having the same fault type and the same key. The number of occurrences N may be acquired from the learning data DB 31, and the number of occurrences $N_F$ may be acquired from the count data DB 32.

In a case where, for a fault type, no value of the learning data of a correct answer having a key coincident with the key of the detection target data coincides with the value of the detection target data, it is difficult to calculate such a detection score as described above, which is based on the number of occurrences. Therefore, the detection unit 26 assigns, as a detection score, a value (for example, "−1") that is different from the above-mentioned detection score based on the number of occurrences and that indicates non-coincidence with the learning data of a correct answer.

For each of sign detection results recorded in the sign detection result list 41, the output determination unit 27 determines whether or not the occurrence of a fault indicated by a fault type caused by a setting error for a setting item indicated by a key depends on a software configuration. Specifically, the output determination unit 27 acquires, from the degree-of-dependence DB 35, the degree of dependence D corresponding to a fault type and a key included in the relevant one of the sign detection results. In a case where the acquired degree of dependence D is greater than a predetermined threshold value $D_{th}$, the output determination unit 27 determines that the occurrence of a fault corresponding to the fault type and the key depends on a software configuration.

By using the same method as that of the software configuration learning unit 24, the output determination unit 27 generates a software configuration pattern p from the configuration information of the detection target. It is assumed that, from the configuration information of the detection target, the identification information 372 and the update date and time 373 of each of the setting files 371 are extracted as follows, for example.

2010/1/1, /etc/xxx.conf
 2015/6/10, /etc/my.cnf
 2015/6/11, /etc/httpd/conf/httpd.conf In this case, based on the setting file list 46 illustrated in FIG. 12, the pieces of identification information 372 are replaced with respective IDs and are sorted in the order of update dates and times, and the software configuration pattern p of (4,3,1) is generated.

The output determination unit 27 extracts, from the software configuration DB 34, all the software configuration patterns P={$P_1,P_2,\ldots$} corresponding to fault types and keys for which it is determined that the occurrences of faults depend on software configurations. In a case of, for example, F=0003 and K="/etc/httpd/conf/httpd.conf:AuthMySQLUser", $P_1$=(4,3,2,1) and $P_2$=(4,3,2,1) are extracted from the software configuration DB 34 illustrated in FIG. 13.

The output determination unit 27 calculates the degree of similarity between the generated software configuration pattern p and each of the software configuration patterns $P_i$ extracted from the software configuration DB 34. Specifically, the output determination unit 27 calculates a Levenshtein distance between the software configuration pattern p and each of the software configuration patterns $P_i$, as the degree of similarity between both the software configuration patterns. Hereinafter, the Levenshtein distance between x and y is expressed as $d_L(x,y)$. In the calculation of a distance, it is assumed that an insertion or deletion cost is "1" and a cost of replacement is "2". A decrease in the Levenshtein distance $d_L(p,P_i)$ indicates that the degree of similarity between both the software configuration patterns increases. Accordingly, in a case where the Levenshtein distance $d_L(p,P_i)$ between the software configuration pattern p and one of the software configuration patterns $P_i$ is lower than a predetermined threshold value $d_{th}$, the output determination unit 27 determines that both the software configuration patterns are similar.

The Levenshtein distance $d_L(p,P_1)$ between, for example, the software configuration pattern p=(4,3,1) and the software configuration pattern $P_1$=(4,3,2,1) is "2". In a case where it is assumed that $d_{th}$=1 is satisfied, $d_L(p,P_1)$=2>$d_{th}$=1 is satisfied. Therefore, it is determined that both the software configuration patterns are similar.

In a case of determining that the software configuration pattern p is similar to none of the software configuration patterns $P_i$, the output determination unit 27 deletes the corresponding sign detection result in the sign detection result list 41. This means that, based on a thought that a fault dependent on a software configuration occurs in systems the software configurations of which are similar, a possibility that the relevant fault occurs is regarded as low in a case where software configurations are not similar. The output determination unit 27 performs the above-mentioned determination for each of the sign detection results in the sign detection result list 41 and outputs the final sign detection result list 41.

Figure 18:
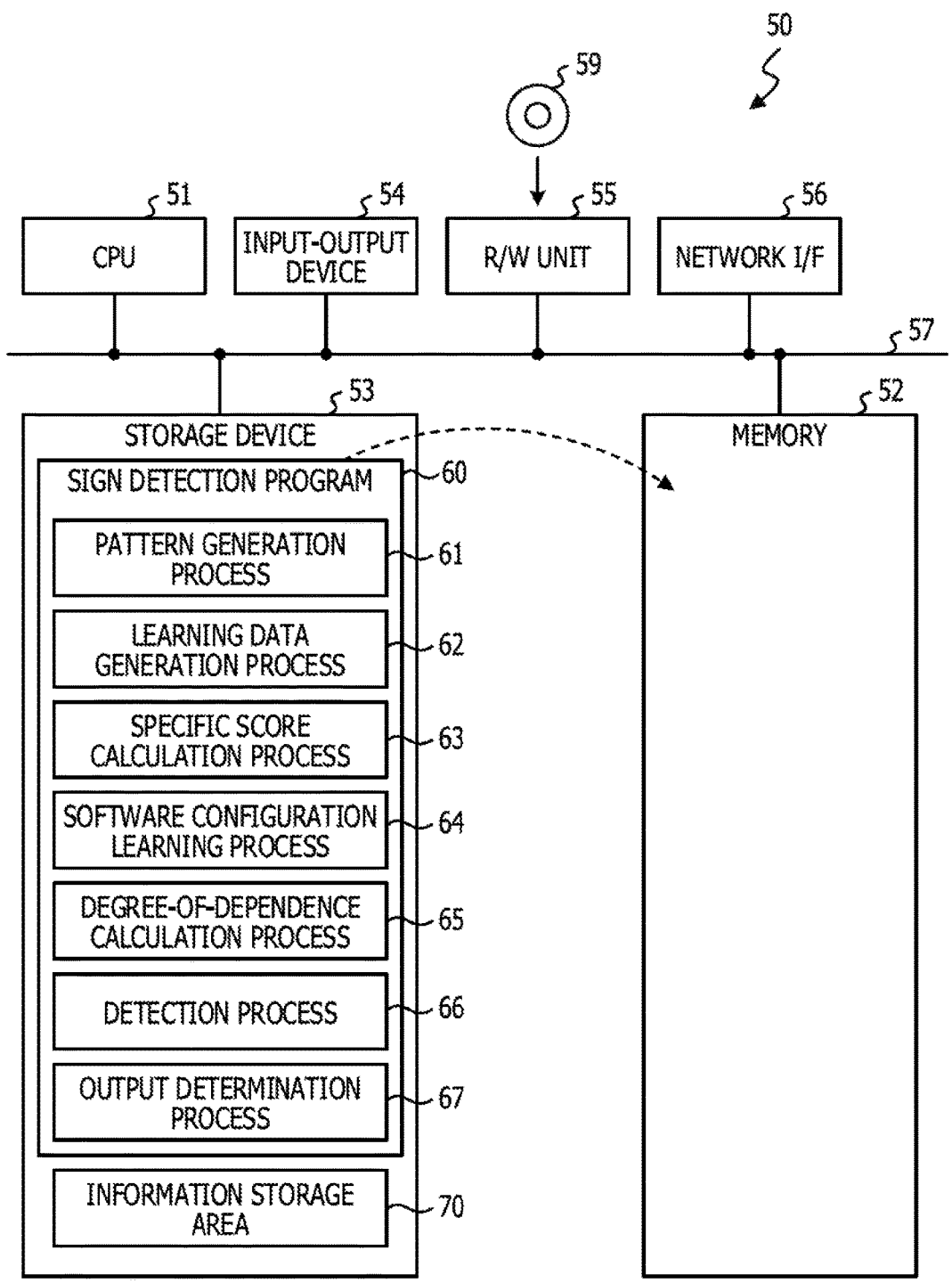
FIG. 18 is block diagram illustrating a schematic configuration of a computer functioning as the sign detection device according to the present embodiment.

The sign detection device 10 may be realized by a computer 50 illustrated in, for example, FIG. 18. The computer 50 includes a CPU 51, a memory 52 serving as a temporary storage area, and a non-volatile storage device 53. The computer 50 includes an input-output device 54, a read/write (R/W) unit 55 to control reading and writing of data from and to a recording medium 59, and a network I/F 56 to be coupled to a network 12 such as the Internet. The CPU 51, the memory 52, the storage device 53, the input-output device 54, the R/W unit 55, and the network I/F 56 are coupled to one another via a bus 57.

The storage device 53 may be realized by a hard disk drive (HDD), a solid state drive (SSD), a flash memory, or the like. In the storage device 53 serving as a storage medium, a sign detection program 60 used for causing the computer 50 to function as the sign detection device 10 is stored. The storage device 53 includes an information storage area 70 in which information to configure various databases and lists is stored.

The CPU 51 reads and deploys the sign detection program 60 from the storage device 53 and in the memory 52. In addition, the CPU 51 sequentially executes processes included in the sign detection program 60. The CPU 51 reads information stored in the information storage area 70 and deploys the information in the memory 52 as various databases and lists.

The sign detection program 60 includes a pattern generation process 61, a learning data generation process 62, a specific score calculation process 63, a software configuration learning process 64, a degree-of-dependence calculation process 65, a detection process 66, and an output determination process 67.

The CPU 51 executes the pattern generation process 61, thereby operating as the pattern generation unit 21 illustrated in FIG. 2. The CPU 51 executes the learning data generation process 62, thereby operating as the learning data generation unit 22 illustrated in FIG. 2. The CPU 51 executes the specific score calculation process 63, thereby operating as the specific score calculation unit 23 illustrated in FIG. 2. The CPU 51 executes the software configuration learning process 64, thereby operating as the software configuration learning unit 24 illustrated in FIG. 2. The CPU 51 executes the degree-of-dependence calculation process 65, thereby operating as the degree-of-dependence calculation unit 25 illustrated in FIG. 2. The CPU 51 executes the detection process 66, thereby operating as the detection unit 26 illustrated in FIG. 2. The CPU 51 executes the output determination process 67, thereby operating as the output determination unit 27 illustrated in FIG. 2. From this, the computer 50 that executes the sign detection program 60 turns out to function as the sign detection device 10.

Functions realized by the sign detection program 60 may be realized by, for example, a semiconductor integrated circuit, more specifically, by an application specific integrated circuit (ASIC) or the like.

Figure 19:
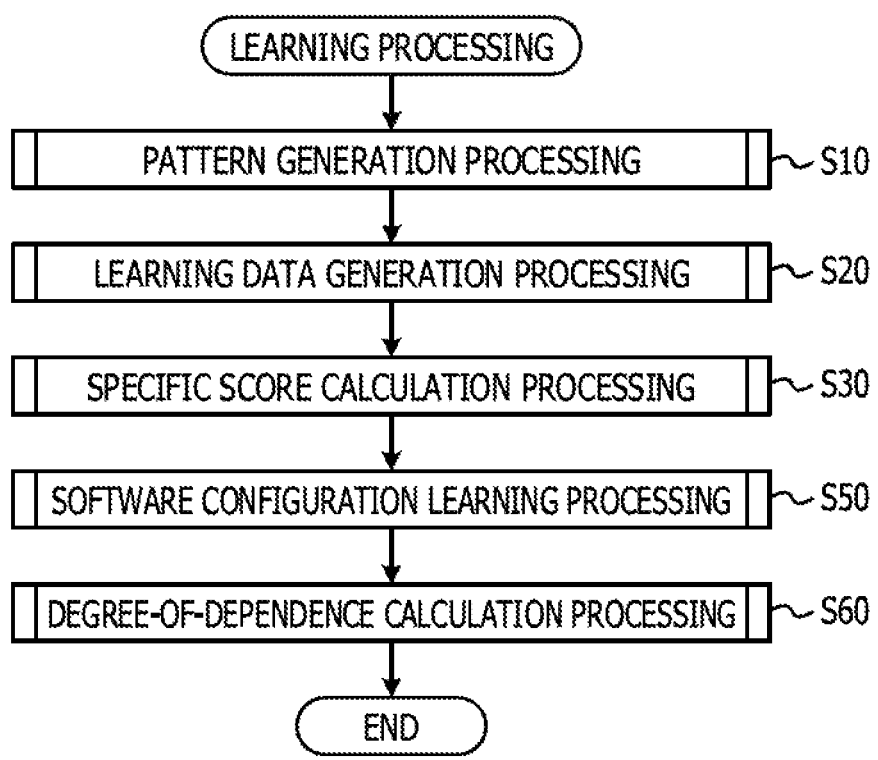
FIG. 19 is a flowchart illustrating an example of learning processing.
Figure 25:
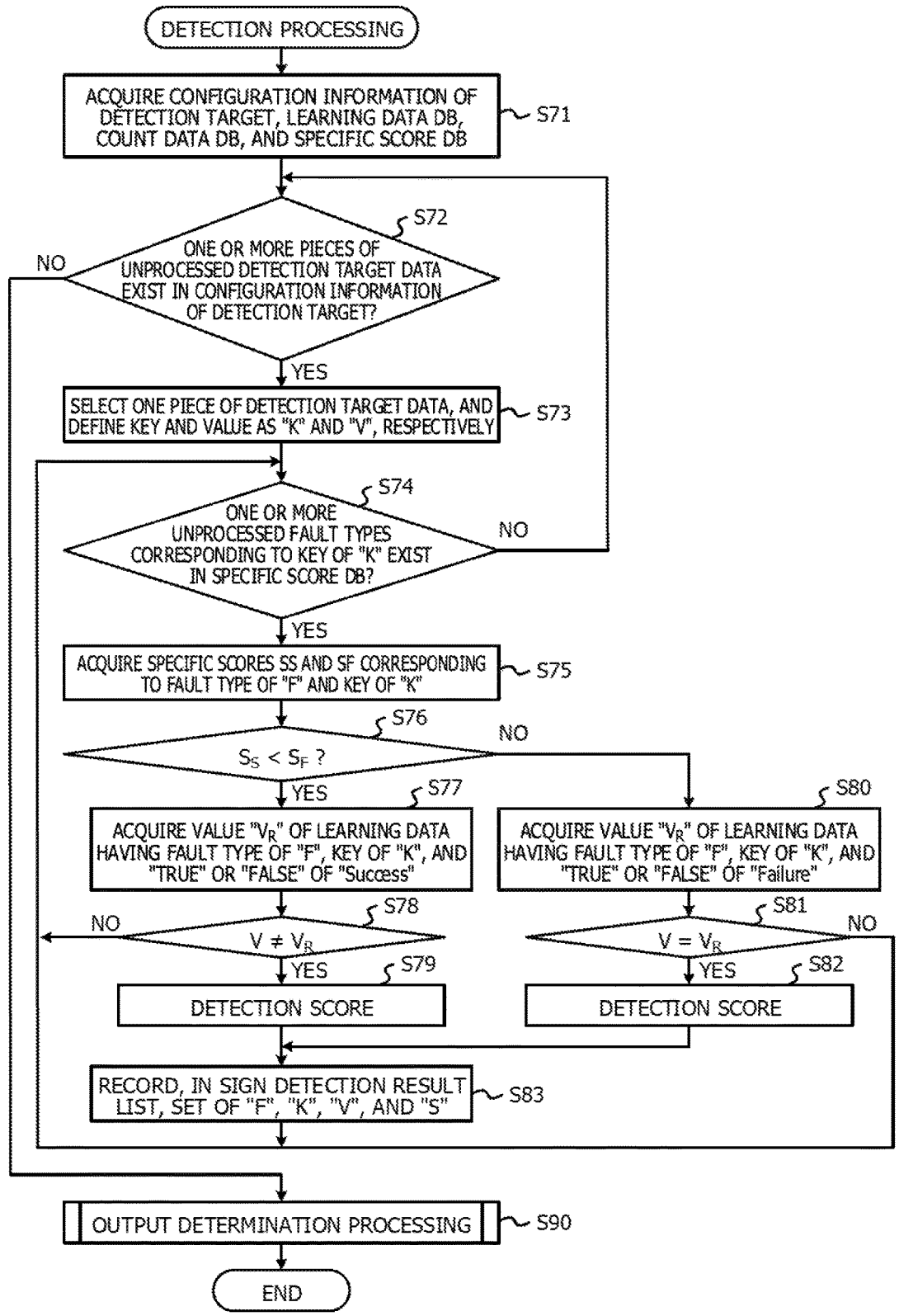
FIG. 25 is a flowchart illustrating an example of detection processing.

Next, operations of the sign detection device 10 according to the present embodiment will be described. First, if the pieces of case data 36 are input to the sign detection device 10, learning processing illustrated in FIG. 19 is performed in the sign detection device 10. In addition, the learning data DB 31, the count data DB 32, the specific score DB 33, the software configuration DB 34, and the degree-of-dependence DB 35 are stored in the storage unit 30. If, in this state, configuration information of a detection target is input to the sign detection device 10, detection processing illustrated in FIG. 25 is performed in the sign detection device 10, and the sign detection result list 41 is output. The learning processing and the detection processing, performed by the sign detection device 10, correspond to an example of a sign detection method. Hereinafter, each of the pieces of processing will be described in detail.

Figure 20:
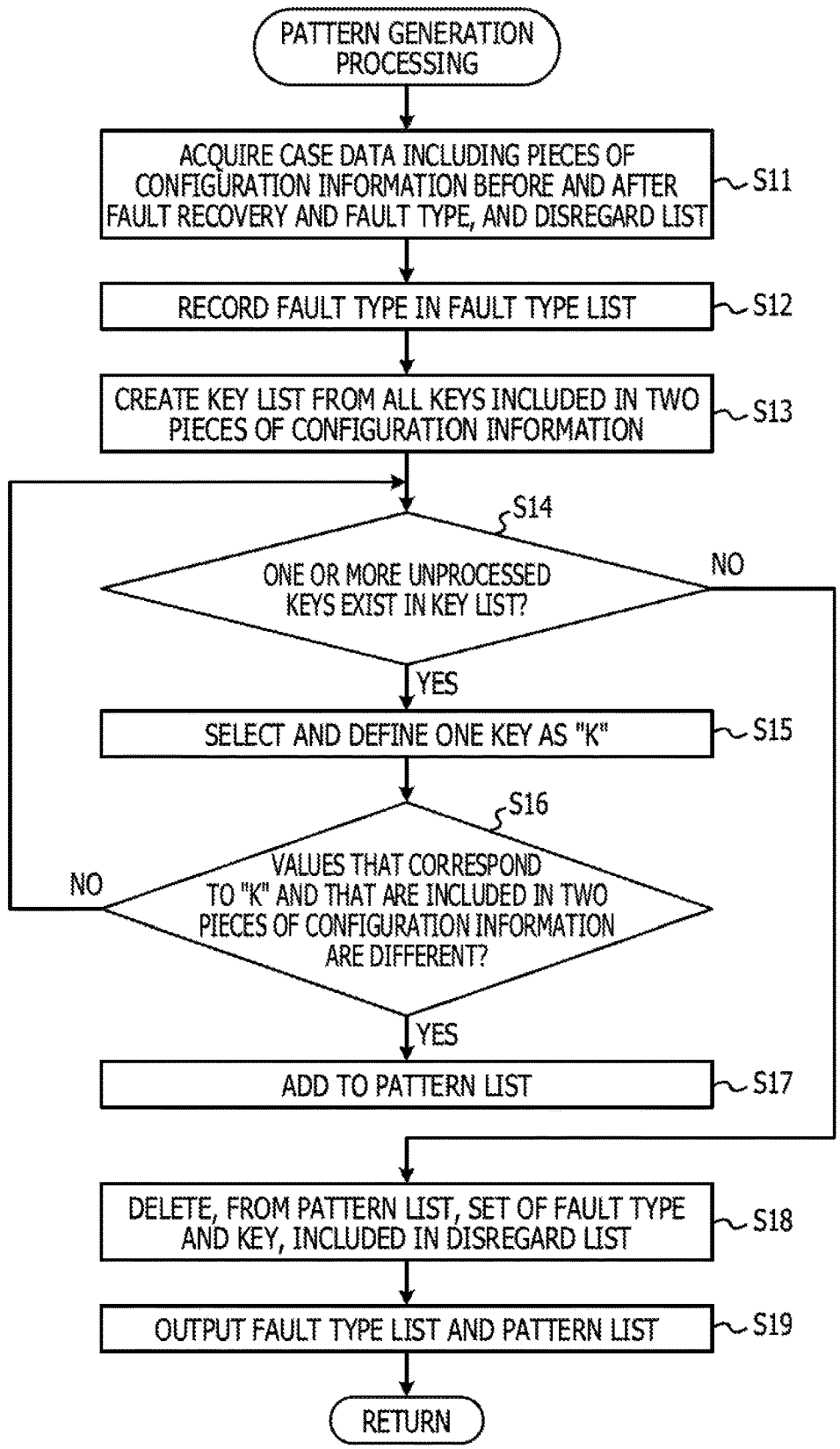
FIG. 20 is a flowchart illustrating an example of pattern generation processing.

In S10 in the learning processing illustrated in FIG. 19, the pattern generation unit 21 performs pattern generation processing the details of which are illustrated in FIG. 20.

In S11 in the pattern generation processing illustrated in FIG. 20, the pattern generation unit 21 acquires one of the pieces of case data 36 from the input pieces of case data 36. The relevant piece of case data 36 includes the configuration information 37A before a fault recovery, the configuration information 37B after the fault recovery, and the fault type 38. The pattern generation unit 21 acquires the disregard list 45 stored in a predetermined area (the illustration thereof is omitted).

Figure 5:
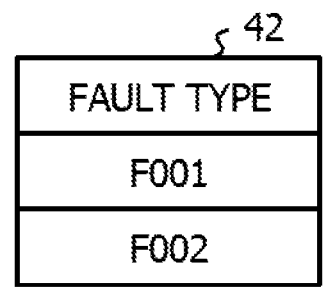

Next, in S12, the pattern generation unit 21 records, in such a fault type list 42 as illustrated in, for example, FIG. 5, the fault type 38 included in the acquired case data 36.

Next, in S13, the pattern generation unit 21 extracts all keys from each of the configuration information 37A before the fault recovery and the configuration information 37B after the fault recovery, included in the acquired case data 36. In addition, the pattern generation unit 21 creates such a key list 43 as illustrated in, for example, FIG. 6.

Next, in S14, the pattern generation unit 21 determines whether or not one or more keys for which the following processing operations in S15 to S17 have not been performed exist in the key list 43. In a case where one or more unprocessed keys exist, the processing makes a transition to S15, and the pattern generation unit 21 selects one from the one or more unprocessed keys and defines it as a key K.

Next, in S16, the pattern generation unit 21 acquires, from the configuration information 37A before the fault recovery and the configuration information 37B after the fault recovery, respective values before and after the fault recovery, which correspond to the key K. In addition, the pattern generation unit 21 determines whether or not the acquired values before and after the fault recovery are different. If these are different, the processing makes a transition to S17, and if these are equal, the processing returns to S14.

In S17, the pattern generation unit 21 generates a pattern in which the fault type included in the case data 36 acquired in S11, the key K, and the value $V_A$ before the fault recovery, and the value $V_B$ after the fault recovery are associated, the value $V_A$ before the fault recovery and the value $V_B$ after the fault recovery corresponding to the key K. In addition, the pattern generation unit 21 adds the generated pattern to such a pattern list 44 as illustrated in, for example, FIG. 7.

If, in the above-mentioned S14, it is determined that no unprocessed key exist, the processing makes a transition to S18. In S18, the pattern generation unit 21 deletes, from the pattern list 44, a pattern including a fault type and a key that coincide with a predetermined set of a fault type and a key in the disregard list 45 acquired in S11.

Next, in S19, the pattern generation unit 21 outputs the generated fault type list 42 and pattern list 44. If the pattern generation processing for all the input pieces of case data 36 finishes, the processing returns to the learning processing illustrated in FIG. 19.

Figure 21:
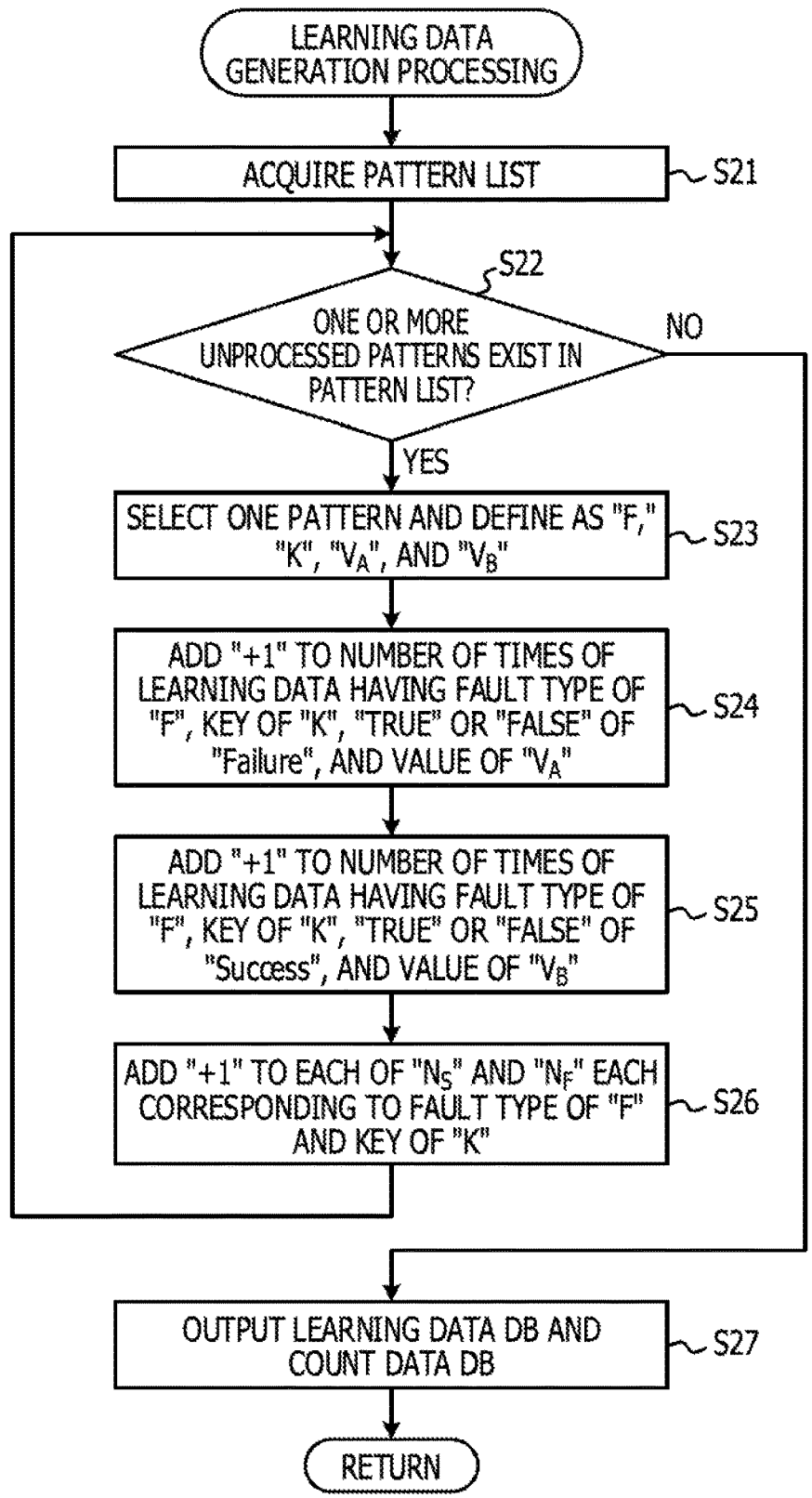
FIG. 21 is a flowchart illustrating an example of learning data generation processing.

Next, in S20 in the learning processing illustrated in FIG. 19, the learning data generation unit 22 performs learning data generation processing the details of which are illustrated in FIG. 21.

In S21 in the learning data generation processing illustrated in FIG. 21, the learning data generation unit 22 acquires the pattern list 44 output by the pattern generation unit 21.

Next, in S22, the learning data generation unit 22 determines whether or not one or more patterns for which the following processing operations in S23 to S26 have not been performed exist in the pattern list 44. In a case where one or more unprocessed patterns exist, the processing makes a transition to S23. In S23, the learning data generation unit 22 selects one from the one or more unprocessed patterns. A fault type, a key, a value before a fault recovery, and a value after the fault recovery, included in the pattern, are defined as F, K, $V_A$, and $V_B$, respectively.

Next, in S24, in such a learning data DB 31 as illustrated in, for example, FIG. 9, the learning data generation unit 22 increases, by "1", the number of times of learning data having a fault type of "F", a key of "K", and a value of $V_A$ and having "true" or "false" of "Failure". Next, in S25, in the learning data DB 31, the learning data generation unit 22 increases, by "1", the number of times of learning data having a fault type of "F", a key of "K", and a value of $V_B$ and having "true" or "false" of "Success". In S24 or S25, in a case where no corresponding learning data is registered in the learning data DB 31, the learning data generation unit 22 sets the number of times to "1" after adding the corresponding learning data.

Next, in S26, in such a count data DB 32 as illustrated in, for example, FIG. 10, the learning data generation unit 22 increases, by "1", each of pieces of count data ($N_S$ and $N_F$) corresponding to a fault type of "F" and a key of "K", and the processing returns to S22. In a case where no corresponding count data is registered in the count data DB 32, the learning data generation unit 22 sets each of $N_S$ and $N_F$ to "1" after adding the corresponding pieces of count data.

In a case where, in the above-mentioned S22, it is determined that no unprocessed pattern exists, the processing makes a transition to S27, the learning data generation unit 22 outputs the learning data DB 31 and the count data DB 32, and the processing returns to the learning processing illustrated in FIG. 19.

Figure 22:
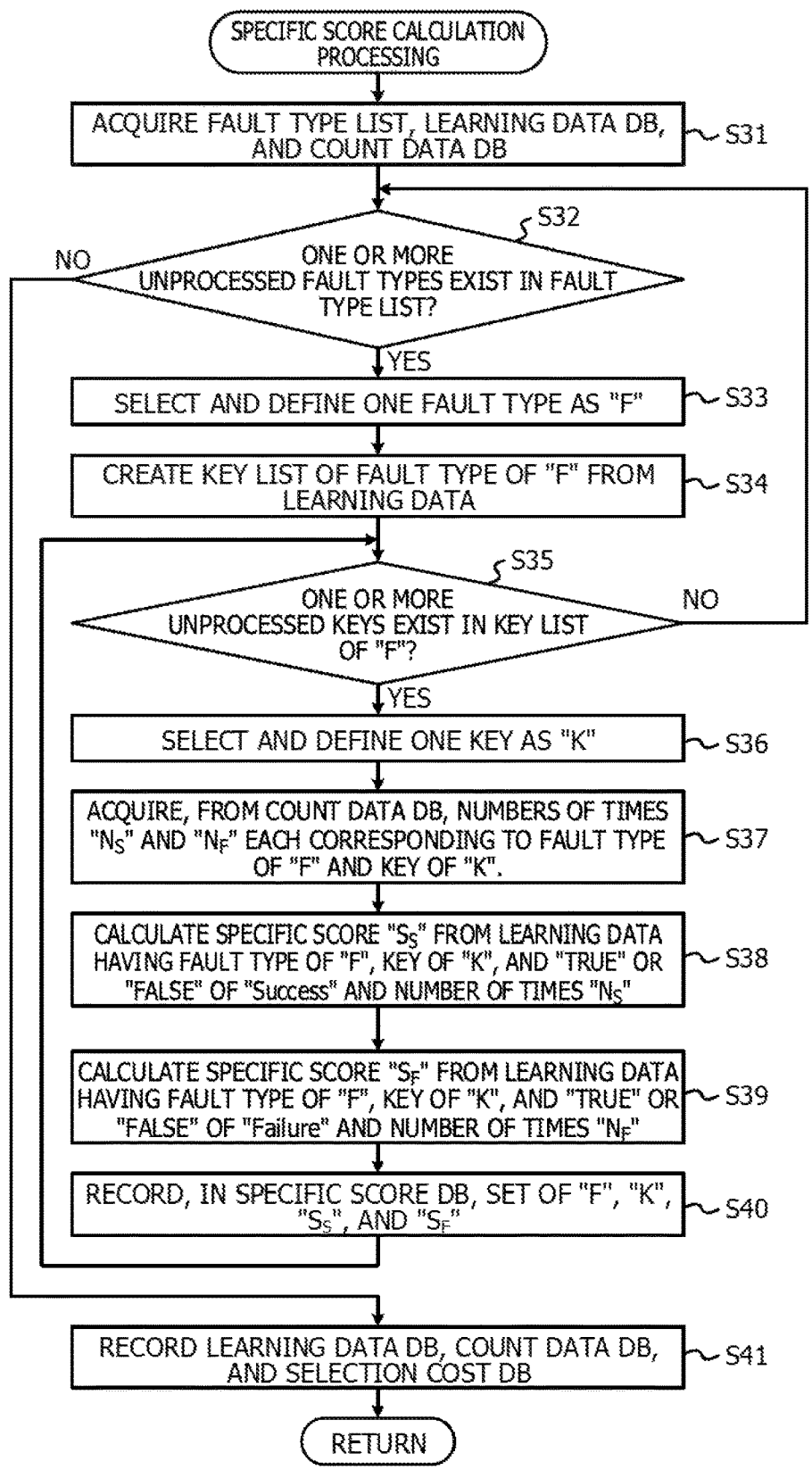
FIG. 22 is a flowchart illustrating an example of specific score calculation processing.

Next, in S30 in the learning processing illustrated in FIG. 19, the specific score calculation unit 23 performs specific score calculation processing the details of which are illustrated in FIG. 22.

In S31 in the specific score calculation processing illustrated in FIG. 22, the specific score calculation unit 23 acquires the fault type list 42 output by the pattern generation unit 21, and the learning data DB 31 and the count data DB 32, output by the learning data generation unit 22.

Next, in S32, the specific score calculation unit 23 determines whether or not one or more fault types for which the following processing operations in S33 to S40 have not been performed exist in the fault type list 42. In a case where one or more unprocessed fault types exist, the processing makes a transition to S33. In addition, the specific score calculation unit 23 selects one from the one or more unprocessed fault types and defines it as a fault type "F".

Next, in S34, the specific score calculation unit 23 extracts all keys included in learning data that has the fault type of "F" and that is included in the learning data recorded in the learning data DB 31, and the specific score calculation unit 23 creates a key list of "F". Next, in S35, the specific score calculation unit 23 determines whether or not one or more keys for which the following processing operations in S36 to S40 have not been performed exist in the key list of "F". In a case where one or more unprocessed keys exist, the processing makes a transition to S36. In addition, the specific score calculation unit 23 selects one from the one or more unprocessed keys and defines it as a key K.

Next, in S37, the specific score calculation unit 23 acquires, from the count data DB 32, pieces of count data ($N_S$ and $N_F$) each corresponding to a fault type of "F" and a key of "K".

Next, in S38, the specific score calculation unit 23 acquires, from the learning data DB 31, the number of times of learning data having a fault type of "F", a key of "K", and "true" or "false" of "Success", for each of values of the learning data. In addition, by using the number of times $N_S$ acquired in the above-mentioned S37 and the number of times acquired from the learning data, the specific score calculation unit 23 obtains an empirical probability for each of the values. The specific score calculation unit 23 calculates the specific score $S_S$ of a correct answer by using, for example, Expression (1).

Next, in S39, the specific score calculation unit 23 acquires, from the learning data DB 31, the number of times of learning data having a fault type of "F", a key of "K", and "true" or "false" of "Failure", for each of values of the learning data. In addition, by using the number of times $N_F$ acquired in the above-mentioned S37 and the number of times acquired from the learning data, the specific score calculation unit 23 obtains an empirical probability for each of the values. The specific score calculation unit 23 calculates the specific score $S_F$ of an erroneous answer by using, for example, Expression (2).

Next, in S40, the specific score calculation unit 23 records, in such a specific score DB 33 as illustrated in, for example, FIG. 11, a set of the fault type of "F", the key of "K", the specific score of "$S_S$", and the specific score of "$S_F$", and the processing returns to S35.

If, in the above-mentioned S35, it is determined that no unprocessed key exists, the processing makes a transition to S32. If, in S32, it is determined that no unprocessed fault type exists, the processing makes a transition to S41.

In S41, the specific score calculation unit 23 stores, in the storage unit 30, the learning data DB 31, the count data DB 32, and the specific score DB 33, and the processing returns to the learning processing illustrated in FIG. 19.

Figure 23:
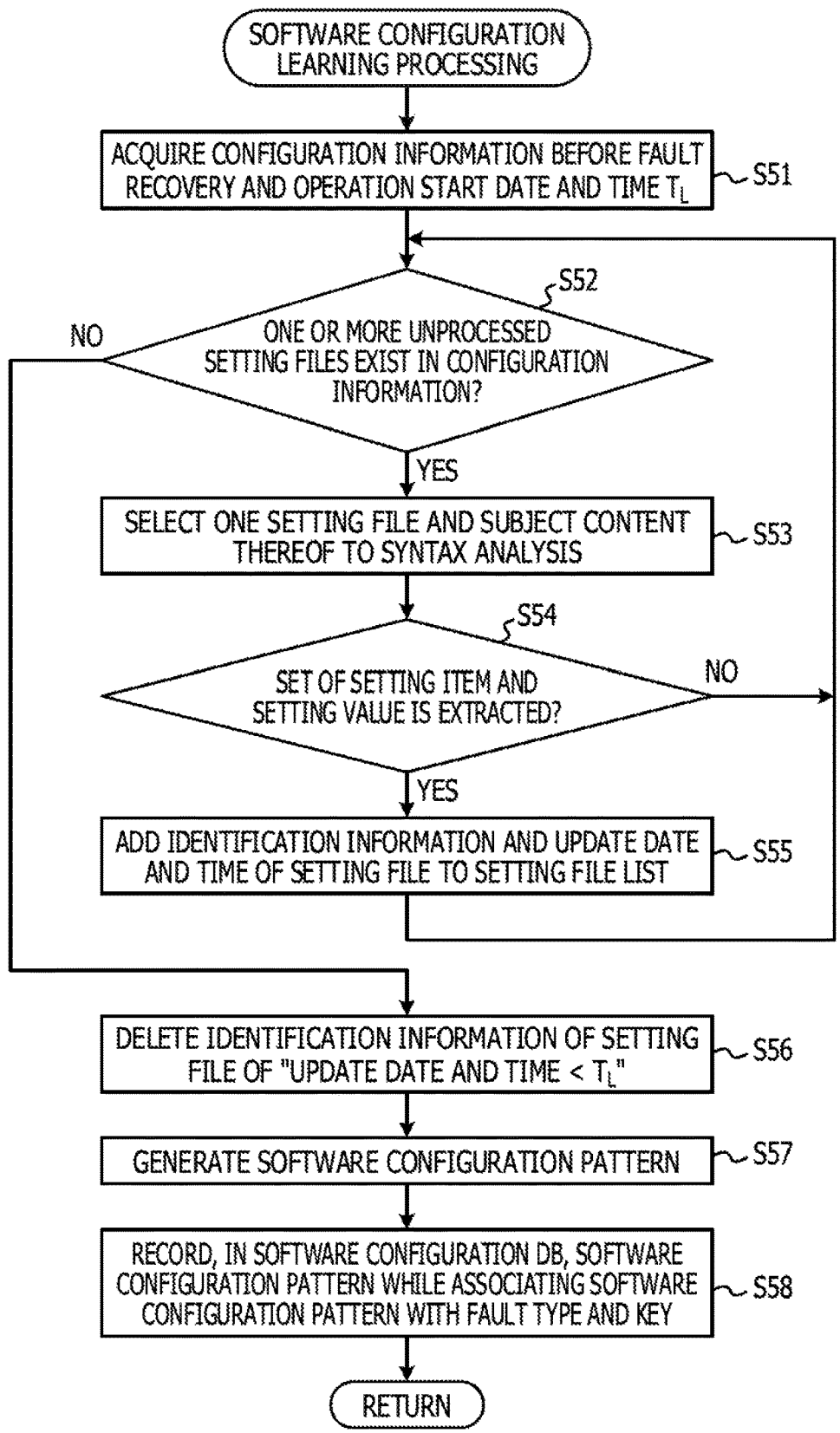
FIG. 23 is a flowchart illustrating an example of software configuration learning processing.

Next, in S50 in the learning processing illustrated in FIG. 19, the software configuration learning unit 24 performs software configuration learning processing the details of which are illustrated in FIG. 23.

In S51 in the software configuration learning processing illustrated in FIG. 23, the software configuration learning unit 24 acquires the configuration information 37A from which the learning data is extracted. The software configuration learning unit 24 receives information of an operation start date and time (for example, an OS installation date and time) $T_L$.

Next, in S52, the software configuration learning unit 24 determines whether or not one or more setting files for which the following processing operations in S53 to S55 have not been performed exist in the configuration information 37A. In a case where one or more unprocessed setting files exist, the processing makes a transition to S53.

In S53, the software configuration learning unit 24 selects one from the one or more unprocessed setting files and subjects a content of the relevant setting file to syntax analysis by using, for example, a regular expression, thereby searching for a set of a setting item and a setting value that are matched with the regular expression.

Next, in S54, based on a result of the syntax analysis in the above-mentioned S53, the software configuration learning unit 24 determines whether or not a set of a setting item and a setting value that are matched with the regular expression is extracted from the configuration information 37A. In a case where the set of a setting item and a setting value is extracted, the software configuration learning unit 24 determines that the setting file is a setting file for software, and the processing makes a transition to S55. On the other hand, in a case where no set of a setting item and a setting value is extracted, the software configuration learning unit 24 determines that the setting file is not a setting file for software, and the processing returns to S52.

In S55, the software configuration learning unit 24 extracts the identification information 372 and the update date and time 373 of the setting file selected in the above-mentioned S53. The software configuration learning unit 24 records the identification information 372 in such a setting file list 46 as illustrated in, for example, FIG. 12. The software configuration learning unit 24 assigns an ID such as a numeric character or a symbol to the identification information 372.

If, in the above-mentioned S52, it is determined that no unprocessed setting file exists, the processing makes a transition to S56. In S56, the software configuration learning unit 24 deletes identification information of a setting file the update date and time of which is smaller than "$T_L$", from pieces of identification information of setting files extracted in the above-mentioned S54.

Next, in S57, the software configuration learning unit 24 replaces pieces of identification information of setting files extracted in the above-mentioned S54 with respective IDs assigned in the setting file list 46 and sorts these in the order of update dates and times, thereby generating a software configuration pattern.

Next, in S58, the software configuration learning unit 24 records, in such a software configuration DB 34 as illustrated in, for example, FIG. 13, the generated software configuration pattern while associating the generated software configuration pattern with the fault type 38 and a key, extracted from the corresponding piece of case data 36. In addition, the processing returns to the learning processing illustrated in FIG. 19.

Figure 24:
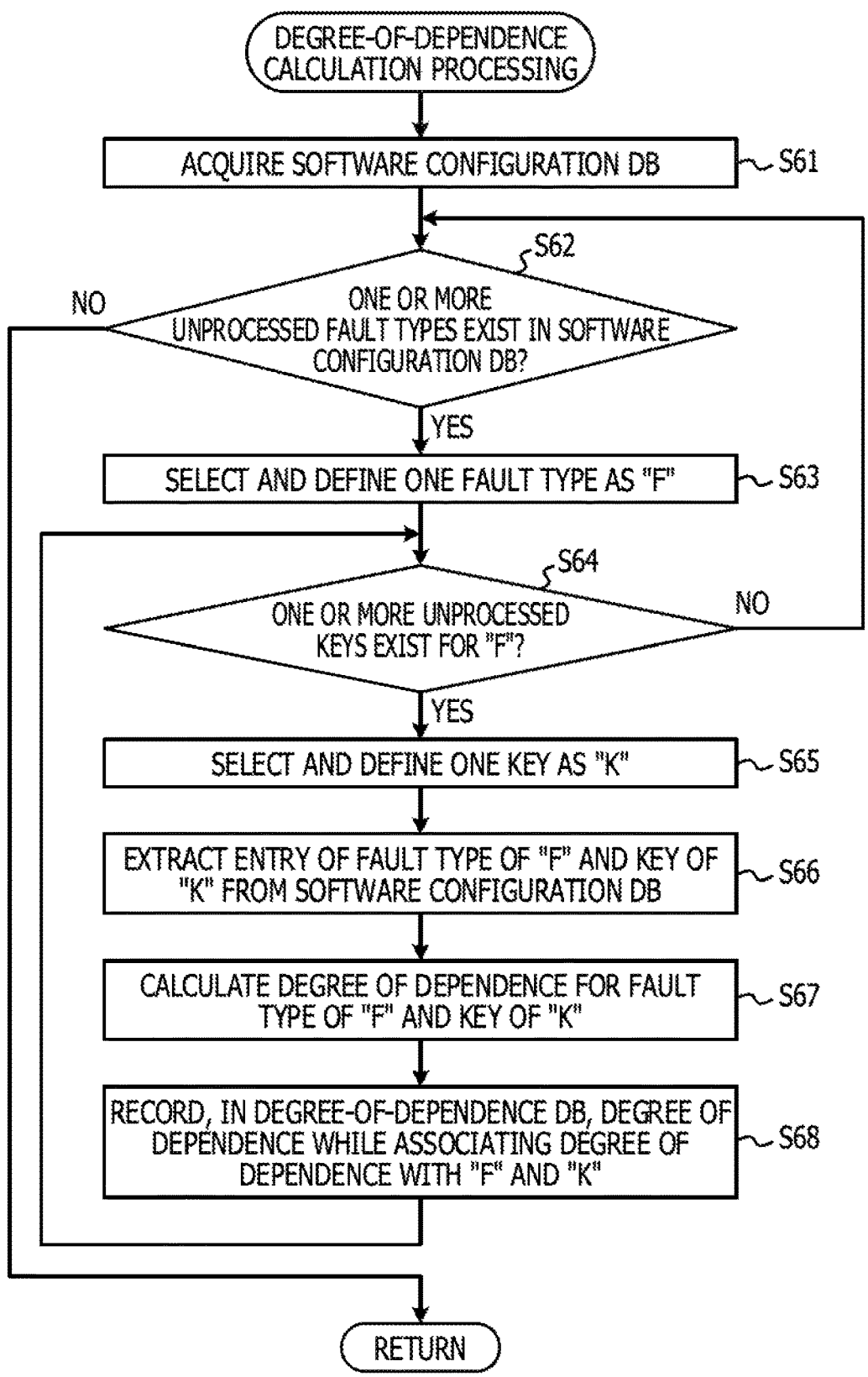
FIG. 24 is a flowchart illustrating an example of degree-of-dependence calculation processing.

Next, in S60 in the learning processing illustrated in FIG. 19, the degree-of-dependence calculation unit 25 performs degree-of-dependence calculation processing the details of which are illustrated in FIG. 24.

In S61 in the degree-of-dependence calculation processing illustrated in FIG. 24, the degree-of-dependence calculation unit 25 acquires the software configuration DB 34.

Next, in S62, the degree-of-dependence calculation unit 25 determines whether or not one or more fault types for which the following processing operations in S63 to S68 have not been performed exist in the software configuration DB 34. In a case where one or more unprocessed fault types exist, the processing makes a transition to S63. In addition, the degree-of-dependence calculation unit 25 selects one from the one or more unprocessed fault types and defines it as "F".

Next, in S64, the degree-of-dependence calculation unit 25 determines whether or not one or more keys, for which the following processing operations in S65 to S68 have not been performed and which correspond to the fault type of "F", exist in the software configuration DB 34. In a case where one or more unprocessed keys exist, the processing makes a transition to S65. In addition, the degree-of-dependence calculation unit 25 selects one from the one or more unprocessed keys and defines it as "K".

Next, in S66, the degree-of-dependence calculation unit 25 extracts an entry of the fault type of "F" and the key of "K" from the software configuration DB 34. In addition, in the subsequent S67, based on, for example, Expression (3), the degree-of-dependence calculation unit 25 calculates the degree of dependence for the fault type of "F" and the key of "K". Next, in S68, the degree-of-dependence calculation unit 25 records, in such a degree-of-dependence DB 35 as illustrated in, for example, FIG. 16, the calculated degree of dependence while associating the calculated degree of dependence with the fault type of "F" and the key of "K", and the processing returns to S64.

If, in S64, it is determined that no unprocessed key exists, the processing returns to S62, and if, in S62, it is determined that no unprocessed fault type exists, the processing returns to the learning processing illustrated in FIG. 19, and the learning processing is terminated.

Next, in S71 in the detection processing illustrated in FIG. 25, the detection unit 26 acquires input configuration information of a detection target. The detection unit 26 acquires the learning data DB 31, the count data DB 32, and the specific score DB 33, stored in the storage unit 30.

Next, in S72, the detection unit 26 determines whether or not one or more pieces of detection target data, for which the following processing operations in S73 to S83 have not been performed and which are included in pieces of detection target data expressed by sets of keys and values included in the configuration information of the detection target, exist. In a case where one or more pieces of unprocessed detection target data exist, the processing makes a transition to S73, and the detection unit 26 selects one from the one or more pieces of unprocessed detection target data. In addition, a key and a value, included in the selected piece of detection target data, are defined as "K" and "V", respectively.

Next, in S74, the detection unit 26 determines whether or not one or more fault types, for which the following processing operations in S75 to S83 have not been performed and which are included in fault types recorded while being associated with the key of "K", exist in the specific score DB 33. In a case where one or more unprocessed fault types exist, the processing makes a transition to S75. The detection unit 26 selects one from the one or more unprocessed fault types and defines it as "F". The detection unit 26 acquires, from the specific score DB 33, the specific score $S_S$ and the specific score $S_F$ for which a fault type is "F" and a key corresponds to "K".

Next, in S76, the detection unit 26 compares the specific score $S_S$ and the specific score $S_F$ and determines whether or not $S_S < S_F$ is satisfied. As described above, the specific score $S_S$ illustrated in the above-mentioned Expression (1) indicates that, with a decrease in the value thereof, the degree of probability of a possibility that a value of the learning data of a correct answer is correct increases. The specific score $S_F$ illustrated in the above-mentioned Expression (2) indicates that, with a decrease in the value thereof, the degree of probability of a possibility that a value of the learning data of an erroneous answer is erroneous increases. Accordingly, in a case of $S_S < S_F$, it is possible to more adequately perform sign detection by using the learning data of a correct answer, whereas in a case of $S_S > S_F$, it is possible to more adequately perform sign detection by using the learning data of an erroneous answer. In a case of $S_S = S_F$, either learning data may be used. However, in the present embodiment, it is assumed that the learning data of an erroneous answer is used. In a case of $S_S < S_F$, the processing makes a transition to S77, and in a case of $S_S \ S_F$, the processing makes a transition to S80.

In S77, the detection unit 26 acquires, from the learning data DB 31, a value of learning data having a fault type of "F", a key of "K", and "true" or "false" of "Success" and defines it as "$V_R$". Next, in S78, the detection unit 26 determines whether or not the value V of the detection target data coincides with the acquired value $V_R$ of the learning data. A case of $V=V_R$ indicates that a correct value is set in the value V of the detection target data V. Therefore, the processing returns to S74 without change. In a case of $V \neq V_R$, the processing makes a transition to S79. In addition, the detection unit 26 sets the detection score S to a value "−1" indicating that the value of the detection target data does not coincide with the learning data of a correct answer, and the processing makes a transition to S83.

On the other hand, in S80, the detection unit 26 acquires, from the learning data DB 31, a value of learning data having a fault type of "F", a key of "K", and "true" or "false" of "Failure" and defines it as "$V_R$". Next, in S81, the detection unit 26 determines whether or not a value V of the detection target data coincides with the acquired value $V_R$ of the learning data. In a case of $V \neq V_R$, an erroneous value is not thought to be set in the value V of the detection target data. Therefore, the processing returns to S74 without change. In a case $V=V_R$, the processing makes a transition to S82. In S82, the detection unit 26 acquires, from the learning data DB 31, the number of occurrences N of learning data of an erroneous answer having a fault type of "F", a key of "K", and a value $V_R$. The detection unit 26 acquires, from the count data DB 32, the number of occurrences $N_F$ of learning data of an erroneous answer having a fault type of "F" and a key of "K". In addition, the detection unit 26 sets the detection score S to $N/N_F$, and the processing makes a transition to S83.

In S83, the detection unit 26 records, in such a sign detection result list 41 as illustrated in, for example, FIG. 17, a set of the fault type of "F", the key of "K", the value of "V", and the detection score S as a result of the sign detection, and the processing returns to S74. If, in S74, it is determined that no unprocessed fault type exists, the processing returns to S72. If, in S72, it is determined that no unprocessed detection target data, the processing makes a transition to S90.

In a case where the values $V_R$ are acquired in the above-mentioned S77, if, in S78, it is determined that the value V of the detection target data coincides with none of the values $V_R$, the processing may make a transition to S79.

In a case where the values $V_R$ are acquired in the above-mentioned S80, if, in S81, it is determined that the value V of the detection target data coincides with one of the values $V_R$, the processing may make a transition to S82. A threshold value $S_{th}$ for the detection score S may be set in advance, and a sign detection result satisfying $S > S_{th}$ may be only added to the sign detection result list 41. From this, it is possible to include only a case of having a higher possibility of being a sign of a fault occurrence in the sign detection result list 41. The threshold value $S_{th}$ may be set to a different value for each of fault types and for each of keys.

Figure 26:
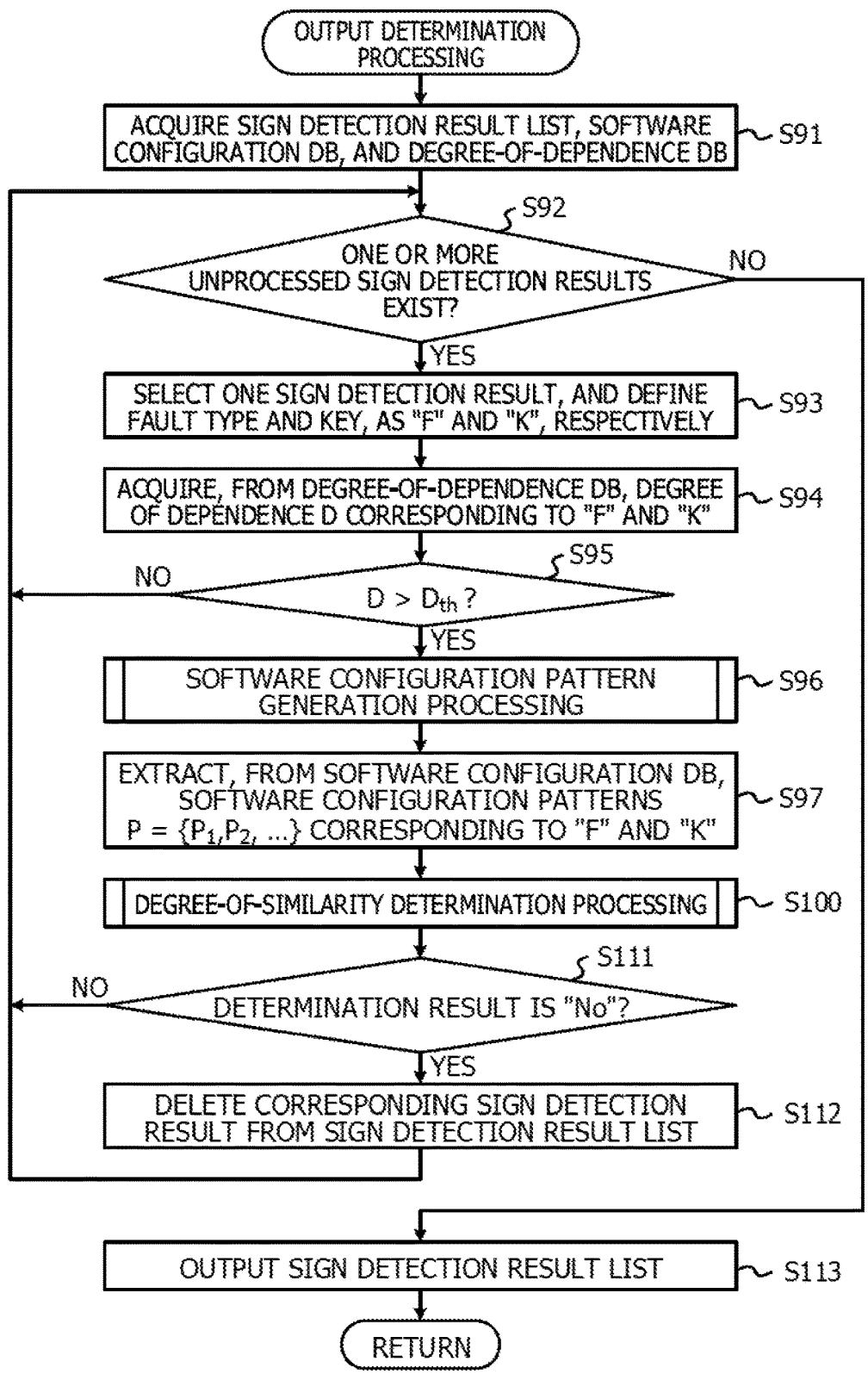
FIG. 26 is a flowchart illustrating an example of output determination processing.

In S90, the output determination unit 27 performs output determination processing the details of which are illustrated in FIG. 26.

In S91 in the output determination processing illustrated in FIG. 26, the output determination unit 27 acquires the sign detection result list 41, the software configuration DB 34, and the degree-of-dependence DB 35. Next, in S92, the output determination unit 27 determines whether or not one or more sign detection results for which the following processing operations in S93 to S112 have not been performed exist in the sign detection result list 41. In a case where one or more unprocessed sign detection results exist, the processing makes a transition to S93.

In S93, the output determination unit 27 selects one from the one or more unprocessed sign detection results and defines a fault type and a key, included in the relevant sign detection result, as "F" and "K", respectively. Next, in S94, the output determination unit 27 acquires, from the degree-of-dependence DB 35, the degree of dependence D corresponding to the fault type of "F" and the key of "K".

Next, in S95, the output determination unit 27 determines whether or not the acquired degree of dependence D is greater than the predetermined threshold value $D_{th}$. In a case of $D > D_{th}$, the output determination unit 27 determines that the occurrence of a fault corresponding to the fault type of "F" and the key of "K" depends on a software configuration, and the processing makes a transition to S96. On the other hand, in a case of $D \leq D_{th}$, the output determination unit 27 determines that the occurrence of a fault corresponding to the fault type of "F" and the key of "K" does not depend on a software configuration, and the processing returns to S92.

In a case of defining, for example, $D_{th}=1.5$, the degree of dependence corresponding to the first sign detection result in the sign detection result list 41 illustrated in FIG. 17 satisfies D=2.08, based on the degree-of-dependence DB 35 illustrated in FIG. 16, and D=2.08>$D_{th}$=1.5 is satisfied. Therefore, there is dependence on a software configuration. The degree of dependence corresponding to the second sign detection result in the sign detection result list 41 illustrated in FIG. 17 satisfies D=1.28, based on the degree-of-dependence DB 35 illustrated in FIG. 16, and D=1.28<$D_{th}$=1.5 is satisfied. Therefore, there is no dependence on a software configuration.

In S96, from the configuration information of the detection target, the output determination unit 27 generates the software configuration pattern p, based on the same processing operations as those in S51 to S57 in the software configuration learning processing illustrated in FIG. 23. "CONFIGURATION INFORMATION BEFORE FAULT RECOVERY" in S51 is replaced with "CONFIGURATION INFORMATION OF DETECTION TARGET". In a case where a loop of the output determination processing is iterated, the software configuration pattern p generated in the first loop only has to be used in the second loop or loops thereafter.

Next, in S97, the output determination unit 27 extracts, from the software configuration DB 34, all software configuration patterns P={$P_1,P_2,\ldots$} that correspond to the fault type of "F" and the key of "K" for which it is determined that the occurrence of a fault depends on a software configuration.

Figure 27:
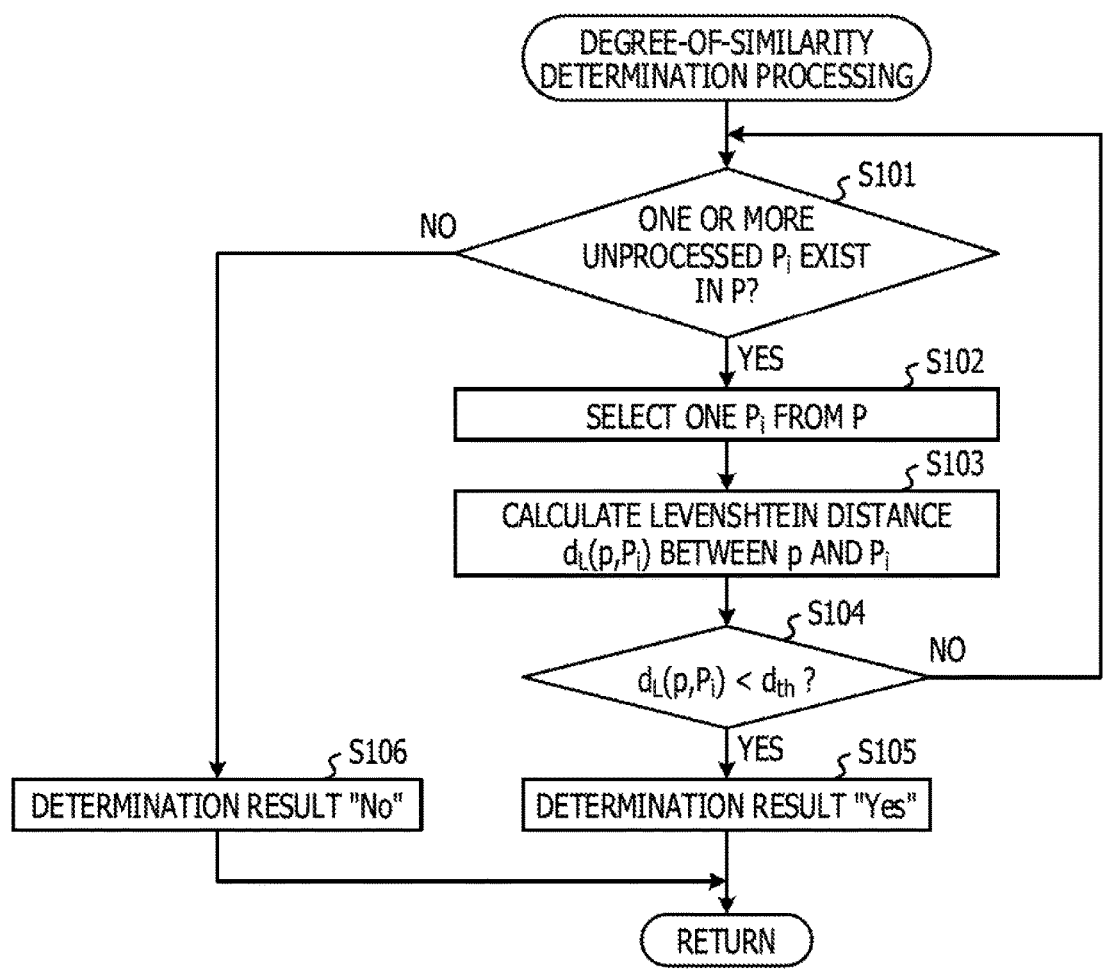
FIG. 27 is a flowchart illustrating an example of degree-of-similarity determination processing.

Next, in S100, the output determination unit 27 performs degree-of-similarity determination processing the details of which are illustrated in FIG. 27.

In S101 in the degree-of-similarity determination processing illustrated in FIG. 27, the output determination unit 27 determines whether or not one or more software configuration patterns $P_i$ for which the following processing operations in S102 to S106 have not been performed exist in the software configuration patterns P extracted from the software configuration DB 34. In a case where one or more unprocessed software configuration patterns $P_i$ exist, the processing makes a transition to S102.

In S102, the output determination unit 27 selects one of the one or more unprocessed software configuration patterns $P_i$ from the software configuration patterns P. Next, in S103, the output determination unit 27 calculates the Levenshtein distance $d_L(p,P_i)$ between the software configuration pattern p and the relevant software configuration pattern $P_i$, as the degree of similarity between both the software configuration patterns.

Next, in S104, the output determination unit 27 determines whether or not the Levenshtein distance $d_L(p,P_i)$ is smaller than the predetermined threshold value $d_{th}$. In a case of $d_L(p,P_i)<d_{th}$, the output determination unit 27 determines that both the software configuration patterns are similar, and the processing makes a transition to S105. In S105, the output determination unit 27 outputs a determination result of "Yes", and the processing returns to the output determination processing illustrated in FIG. 26.

On the other hand, in a case of $d_L(p,P_i) \geq d_{th}$, the output determination unit 27 determines that both the software configuration patterns are not similar, and the processing returns to S101. In a case where, in S101, it is determined that no unprocessed software configuration pattern $P_i$ exists, in other words, in a case where it is determined that none of the software configuration patterns $P_i$ is similar to the software configuration pattern p, the processing makes a transition to S106.

In S106, the output determination unit 27 outputs a determination result of "No", and the processing returns to the output determination processing illustrated in FIG. 26.

Next, in S111 in the output determination processing illustrated in FIG. 26, the output determination unit 27 determines whether or not a determination result in the degree-of-similarity determination processing in the above-mentioned S100 is "No". In a case where the determination result is "No", the processing makes a transition to S112. In addition, the output determination unit 27 deletes the corresponding sign detection result in the sign detection result list 41.

On the other hand, in a case where the determination result is "Yes", the processing returns to S92. If, in S92, it is determined that no unprocessed sign detection result exists in the sign detection result list 41, the processing makes a transition to S113. In S113, the output determination unit 27 outputs the sign detection result list 41. In addition, the processing returns to the detection processing illustrated in FIG. 25, and the detection processing is terminated.

As described above, according to the present embodiment, sign detection of a fault is performed by using the learning data, and after determining whether or not the fault depends on a software configuration, the corresponding sign detection result is output in a case where software configurations in a system at a time of learning and at a time of detection are similar. From this, even in a case where a software configuration is changed, it is possible to adequately detect a setting error. Even if learning data collected by another system is used, whether or not to output a sign detection result is determined in accordance with the degree of similarity of a software configuration. Therefore, it is possible to adequately detect a setting error.

While, in the above-mentioned embodiment, there is described a case where a sign detection result is output if the software configuration pattern p and one of the software configuration patterns $P_i$ are similar for a fault dependent on a software configuration, the present technology is not limited to this. The degree of similarity between, for example, all the software configuration patterns P extracted from the software configuration DB 34 and the software configuration pattern p may be determined.

Specifically, in S100 in the output determination processing illustrated in FIG. 26, in place of the degree-of-similarity determination processing illustrated in FIG. 27, degree-of-similarity determination processing illustrated in FIG. 28 may be performed.

In S201 in the degree-of-similarity determination processing illustrated in FIG. 28, the output determination unit 27 calculates, by using all combinations, distances between individual software configuration patterns $P_i$ included in the software configuration patterns P extracted from the software configuration DB 34. Here, as each of the distances, the Levenshtein distance is used.

In a case where $P_1$=(4,3,2,1), $P_2$=(4,5,1), and $P_3$=(3,4,2,1,5,6) are satisfied under the condition of, for example, P={$P_1,P_2,P_3$}, $d_L(P_1,P_2)$=3, $d_L(P_1,P_3)$=4, and $d_L(P_2,P_3)$=5 are calculated.

Next, in S202, for each of the software configuration patterns $P_i$, the output determination unit 27 calculates an average distance $d_M(P_i)$ from the other software configuration patterns $P_i$, based on the following Expression (4). Here, $d_M(P_1)=3.5$, $d_M(P_2)=4$, and $d_M(P_3)=4.5$ are calculated.

$$d_M(P_i) = \frac{1}{|P|-1} \sum_{P' \in P, P' \neq P_i} d_L(P_i, P') \quad (4)$$

Next, in S203, the output determination unit 27 defines, as a gravity center $P_C$, a software configuration pattern $P_i$ having a minimum average distance $d_M(P_i)$. Here, $P_1$ is defined as the gravity center $P_C$. Next, in S204, the output determination unit 27 sets the threshold value $d_{th}$ to a maximum value of the Levenshtein distances $d_L(P_i, P_C)$ between the individual software configuration patterns $P_i$ and the gravity center $P_C$. Here, a setting of $d_{th}=4$ is performed.

Next, in S205, the output determination unit 27 calculates the Levenshtein distance $d_L(p, P_C)$ between the software configuration pattern p generated from the configuration information of the detection target and the gravity center $P_C$. Here, if it is assumed that $p=(4,3,1)$ is satisfied, $d_L(p, P_C)=1$ is calculated. In addition, the output determination unit 27 determines whether or not $d_L(p, P_C) < d_{th}$ is satisfied. In a case of $d_L(p, P_C) < d_{th}$, the processing makes a transition to S206, and the output determination unit 27 outputs a determination result of "Yes". On the other hand, in a case of $d_L(p, P_C) \geq d_{th}$, the processing makes a transition to S207. In addition, the output determination unit 27 outputs a determination result of "No". In addition, the processing returns to the output determination processing illustrated in FIG. 26.

While, in the above-mentioned embodiment, a case of using the Levenshtein distance as the degree of similarity between software configuration patterns is described, the present technology is not limited to this. The degree of similarity may be determined based on, for example, the number of IDs that are included in the software configuration pattern p generated from the configuration information of the detection target and that are included in IDs included in one $P_i$ of the learned software configuration patterns P. Specifically, in a case where IDs included in one of the software configuration patterns $P_i$ include all the IDs included in the software configuration pattern p or in a case where IDs, which are included in the software configuration pattern p and which are included the IDs included in one of the software configuration patterns $P_i$, is greater than or equal to a predetermined percentage, it may be determined that both the software configuration patterns are similar. In a case of, for example, $p=\{4,3,1\}$ and $P_i=\{4,3,2,1\}$, $\{4,3,1\} \in \{4,3,2,1\}$ is satisfied. Therefore, both the software configuration patterns are similar.

In this case, the order of IDs included in the software configuration pattern is not considered. Therefore, at a time of generating a software configuration pattern, IDs corresponding to individual setting files do not have to be sorted in the order of update dates and times.

While, in the above-mentioned embodiment, there is described a case where learning data of a correct answer and learning data of an erroneous answer are generated from each of pieces of configuration information acquired before and after fault recoveries and sign detection of a fault is performed by using these piece of learning data, the present technology is not limited to this. As learning data, only learning data of an erroneous answer, generated from pieces of configuration information before fault recoveries, may be used, and only learning data of a correct answer, generated from pieces of configuration information after fault recoveries, may be used.

In the above-mentioned embodiment, learning data of a correct answer and learning data of an erroneous answer are generated from each of pieces of configuration information acquired before and after fault recoveries, and the pieces of learning data and detection target data included in configuration information of a detection target are compared, thereby determining whether or not a correct value is set in each of setting items. From this, it is possible to detect a sign of a fault occurrence that is caused by omission of changing a setting value and that is difficult to detect by using a method for detecting a point whose value varies between before and after changing of configuration information and for analyzing whether or not that point may cause a fault.

According to the above-mentioned embodiment, learning data having the higher degree of probability of a possibility of serving a correct answer or a possibility of serving as an error is used out of learning data of a correct answer and learning data of an erroneous answer. From this, it is possible to more adequately detect signs of fault occurrences caused by both an error in changing a setting value and omission of changing a setting value.

While, in the above-mentioned embodiment, a case of including a fault type, a key, a value, and a detection score in a sign detection result is described, a correct value may be added to the sign detection result. Specifically, in a case of performing sign detection by using learning data of a correct answer, a value included in the learning data of a correct answer may be added as a correct value. In a case of performing sign detection by using learning data of an erroneous answer, a value included in learning data having the same fault type and key as those of the former learning data and having "true" or "false" of "Success" may be added as a correct value.

While, in the above, there is described a mode in which the sign detection program 60 serving as an example of a sign detection program according to the present technology is preliminarily stored (installed) in the storage device 53, the present technology is not limited to this. It is possible to provide a sign detection program according to the disclosed technology in a form of being recorded in a recording medium such as a CD-ROM, a DVD-ROM, or a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented method for detecting a fault occurrence within a system including a plurality of information processing devices, the method comprising:
   each time when a failure of the system occurred, acquiring first configuration information from a failed processing device of the plurality of processing devices;
   generating learning data in which a setting item, a setting value that includes a setting error and a fault type are associated with each other;

storing the generated learning data;

determining whether each of fault types included in the learning data depends on a software configuration;

extracting first software configuration pattern indicating a combination of setting files in which settings related to software are described, from the first configuration information, based on a result of the determining whether each of the fault types included in the learning data depends on the software configuration;

storing the extracted first software configuration pattern;

when monitoring the system, acquiring second configuration information from a target processing device of the plurality of processing devices;

extracting second software configuration pattern indicating a combination of setting files in which settings related to software are described, from the acquired second configuration information;

determining whether to output an indication of the fault occurrence within the target processing device based on a result obtained by comparing the second software configuration pattern with the first software configuration pattern; and notifying the indication of the fault occurrence when determined to output the indication of the fault occurrence.

2. The computer-implemented method according to claim 1, wherein the learning data includes correct answer learning data and erroneous answer learning data, and the method further comprises:

calculating a first score associated with the correct answer learning data and a second score associated with the erroneous answer learning data for each fault type; and the determining whether to output uses either the correct answer learning data or the erroneous answer learning data based on the calculated first score and the calculated second score when determining to output the indication of the fault occurrence.

3. The computer-implemented method according to claim 1, wherein the determining whether to output includes:

calculating a degree of dependence that increases with a decrease in a number of variations of the first software configuration pattern; and determining that a fault type depends on the software configuration, when it is determined that the degree of dependence is greater than or equal to a predetermined threshold value.

4. The computer-implemented method according to claim 1, wherein the determining whether to output includes:

calculating a degree of similarity between the first software configuration pattern and the second software configuration pattern, and determining that the detection target is to be output, when it is determined that the calculated degree of similarity is greater than or equal to a predetermined threshold value.

5. The computer-implemented method according to claim 4, further comprising outputting the indication of the fault occurrence within the detection target when it is determined that the detection target is to be output.

6. The computer-implemented method according to claim 4, wherein the calculating the degree of similarity includes calculating the degree of similarity, based on an inclusion relation of setting files included in each of the first software configuration pattern and the second software configuration pattern.

7. The computer-implemented method according to claim 4, wherein each of the first software configuration pattern and the second software configuration pattern is a pattern in which pieces of identification information indicating the respective setting files are arranged in the order of update dates and times of the respective setting files, and the calculating the degree of similarity is calculating, as the degree of similarity, a Levenshtein distance between a pattern indicating the first software configuration information and a pattern indicating the second software configuration pattern.

8. The computer-implemented method according to claim 4, wherein the calculating the degree of similarity includes calculating, as the degree of similarity, a Levenshtein distance between a gravity center and the second software configuration pattern, wherein the gravity center is obtained from Levenshtein distances between individual patterns respectively indicates the first software configuration pattern, and the determining whether to output the indication of the fault occurrence includes determining that the indication is to be output when the degree of similarity is less than a maximum value of Levenshtein distances between the gravity center and respective patterns each indicating the first software configuration pattern.

9. The computer-implemented method according to claim 1, wherein each of the first software configuration pattern and the second software configuration pattern is a combination of setting files set during a predetermined time period after start of an operation of the system.

10. An information processing device, comprising:

a memory; and a processor coupled to the memory and configured to:

each time when a failure of the system occurred, acquire first configuration information from a failed processing device of the plurality of processing devices;

generate learning data in which a setting item, a setting value that includes a setting error and a fault type are associated with each other;

store the generated learning data;

determine whether each of fault types included in the learning data depends on a software configuration;

extract first software configuration pattern indicating a combination of setting files in which settings related to software are described, from the first configuration information, based on a result of the determination of whether each of the fault types included in the learning data depends on the software configuration;

store the extracted first software configuration pattern;

when monitoring the system, acquire second configuration information from a target processing device of the plurality of processing devices;

extract second software configuration pattern indicating a combination of setting files in which settings related to software are described, from the acquired second configuration information;

determine whether to output an indication of the fault occurrence within the target processing device based on a result obtained by comparing the second software configuration pattern with the first software configuration pattern; and
notify the indication of the fault occurrence when determined to output the indication of the fault occurrence.

11. The information processing device according to claim 10, wherein the processor is configured to:
calculate a degree of dependence that increases with a decrease in a number of variations of the first software configuration pattern; and
determine that a fault type depends on the software configuration, when it is determined that the degree of dependence is greater than or equal to a predetermined threshold value.

12. The information processing device according to claim 10, wherein the processor is configured to:
calculate a degree of similarity between the first software configuration pattern and the second software configuration pattern, and
determine that the detection target is to be output, when it is determined that the calculated degree of similarity is greater than or equal to a predetermined threshold value.

13. A non-transitory computer-readable recording medium storing a program that causes a processor included in a transmission apparatus to execute a process, the process comprising:
each time when a failure of the system occurred, acquiring first configuration information from a failed processing device of the plurality of processing devices;
generating learning data in which a setting item, a setting value that includes a setting error and a fault type are associated with each other;
storing the generated learning data;
determining whether each of fault types included in the learning data depends on a software configuration;
extracting first software configuration pattern indicating a combination of setting files in which settings related to software are described, from the first configuration information, based on a result of the determining whether each of the fault types included in the learning data depends on the software configuration;
storing the extracted first software configuration pattern;
when monitoring the system, acquiring second configuration information from a target processing device of the plurality of processing devices;
extracting second software configuration pattern indicating a combination of setting files in which settings related to software are described, from the acquired second configuration information;
determining whether to output an indication of the fault occurrence within the target processing device based on a result obtained by comparing the second software configuration pattern with the first software configuration pattern; and
notifying the indication of the fault occurrence when determined to output the indication of the fault occurrence.

14. The recording medium according to claim 13, wherein the determining whether to output includes:
calculating a degree of dependence that increases with a decrease in a number of variations of the first software configuration pattern; and
determining that a fault type depends on the software configuration, when it is determined that the degree of dependence is greater than or equal to a predetermined threshold value.

15. The recording medium according to claim 13, wherein the determining whether to output includes:
calculating a degree of similarity between the first software configuration pattern and the second software configuration pattern, and
determining that the detection target is to be output, when it is determined that the calculated degree of similarity is greater than or equal to a predetermined threshold value.

* * * * *